(12) United States Patent
Mishima

(10) Patent No.: US 9,967,407 B2
(45) Date of Patent: May 8, 2018

(54) IMAGE READING DEVICE AND METHOD, READING AREA DISPLAY DEVICE AND METHOD, AND PROGRAM

(71) Applicant: FUJIFILM Corporation, Tokyo (JP)

(72) Inventor: Takahiro Mishima, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days. days.

(21) Appl. No.: 15/462,515

(22) Filed: Mar. 17, 2017

(65) Prior Publication Data

US 2017/0195503 A1    Jul. 6, 2017

Related U.S. Application Data

(63) Continuation of application No. PCT/JP2015/077333, filed on Sep. 28, 2015.

(30) Foreign Application Priority Data

Sep. 30, 2014 (JP) ................. 2014-200463

(51) Int. Cl.
*H04N 1/00* (2006.01)
*H04N 1/48* (2006.01)
*H04N 1/60* (2006.01)

(52) U.S. Cl.
CPC ..... *H04N 1/00087* (2013.01); *H04N 1/00023* (2013.01); *H04N 1/00039* (2013.01);
(Continued)

(58) Field of Classification Search
CPC ........... H04N 1/00087; H04N 1/00023; H04N 1/00039; H04N 1/00816
(Continued)

(56) References Cited

U.S. PATENT DOCUMENTS 5,721,624 A * 2/1998 Kumashiro .......... H04N 1/3876
358/450
2008/0285849 A1* 11/2008 Lu ...................... G06K 9/00234
382/166
2010/0185942 A1* 7/2010 Watariuchi ......... H04N 1/00222
715/248

FOREIGN PATENT DOCUMENTS

JP    H 04-092559 A    3/1992
JP    2000-011164 A    1/2000
(Continued)

OTHER PUBLICATIONS

International Search Report (ISR) (PCT Form PCT/ISA/210), in PCT/JP2015/077333, dated Nov. 10, 2015.
(Continued)

*Primary Examiner* — Jamares Q Washington
(74) *Attorney, Agent, or Firm* — McGinn I.P. Law Group, PLLC.

(57) ABSTRACT

In a preferred aspect of the present invention, a color distribution of manuscript image data is analyzed. At least one or more areas satisfying an allowable condition determined for a color distribution in advance in the manuscript image data is set as a reading area on the basis of a result of the analysis of the color distribution of the manuscript image data. A setting position of the printed material with respect to a reading unit that performs reading of the printed material on which an image is printed on the basis of the manuscript image data is displayed on the basis of a result of the setting of the reading area. Reading of the printed material set in the reading unit is performed after the setting position is displayed by a display unit.

14 Claims, 19 Drawing Sheets

(52) U.S. Cl.
CPC ..... *H04N 1/00063* (2013.01); *H04N 1/00806* (2013.01); *H04N 1/00816* (2013.01); *H04N 1/48* (2013.01); *H04N 1/6005* (2013.01); *H04N 1/6008* (2013.01); *H04N 2201/0081* (2013.01)

(58) Field of Classification Search
USPC ...... 358/1.9, 1.12, 1.18, 504, 518, 538, 540; 382/164, 165, 318
See application file for complete search history.

(56) References Cited

FOREIGN PATENT DOCUMENTS

| | | |
|---|---|---|
| JP | 2008-263275 A | 10/2008 |
| JP | 2010-068381 A | 3/2010 |
| JP | 2012-160957 A | 8/2012 |
| JP | 2013-030996 A | 2/2013 |

OTHER PUBLICATIONS

Written Opinion of the ISA/JPO (PCT/ISA/237) in PCT/JP2015/077333, dated Nov. 10, 2015 and English translation thereof.

\* cited by examiner

FIG. 2

LIST DATA — 40

IMPORTANT COLOR LIST (40A)

| No | X, Y | Lab |
|---|---|---|
| 1 | 125, 130 | 80, 18, 22 |
| 2 | 110, 120 | 85, 16, 19 |
| 3 | 200, 30 | 88, −10, −15 |
| ⋮ | ⋮ | ⋮ |

HIGH CHROMA LIST (40B)

| No | X, Y | Lab |
|---|---|---|
| 1 | 150, 273 | 45, 65, 26 |
| 2 | 181, 275 | 46, 67, 30 |
| 3 | 500, 500 | 50, −50, 26 |
| ⋮ | ⋮ | ⋮ |

GRAY LIST (40C)

| No | X, Y | Lab |
|---|---|---|
| 1 | 20, 200 | 88, 0, 1 |
| 2 | 22, 280 | 66, 1, 0 |
| 3 | 21, 400 | 33, 2, −1 |
| ⋮ | ⋮ | ⋮ |

FIG. 19

| BLOCK SIZE (5mm) | TOTAL | SPECIFIC COLOR: IMPORTANT COLOR | SPECIFIC COLOR: HIGH CHROMA COLOR | SPECIFIC COLOR: GRAY COLOR |
|---|---|---|---|---|
| ENTIRE IMAGE | NUMBER OF COLORS: 36 COLORS | NUMBER OF SPECIFIC COLORS FOR EACH COLOR: 1 (BLUE) | NUMBER OF SPECIFIC COLORS FOR EACH COLOR: 2 (RED, GREEN) | NUMBER OF SPECIFIC COLORS FOR EACH COLOR: 0 |
| FIRST CANDIDATE AREA | INCLUSION RATE 70% (25 COLORS) | INCLUSION RATE 100% | INCLUSION RATE 100% | INCLUSION RATE - |
| SECOND CANDIDATE AREA | INCLUSION RATE 72% (26 COLORS) | INCLUSION RATE 100% | INCLUSION RATE 100% | INCLUSION RATE - |
| THIRD CANDIDATE AREA | INCLUSION RATE 89% (32 COLORS) | INCLUSION RATE 0% | INCLUSION RATE 100% | INCLUSION RATE - |
| FOURTH CANDIDATE AREA | INCLUSION RATE 94% (34 COLORS) | INCLUSION RATE 0% | INCLUSION RATE 100% | INCLUSION RATE - |

95

# IMAGE READING DEVICE AND METHOD, READING AREA DISPLAY DEVICE AND METHOD, AND PROGRAM

CROSS-REFERENCE TO RELATED APPLICATIONS

This application is a Continuation of PCT International Application No. PCT/JP2015/077333 filed on Sep. 28, 2015, which claims priority under 35 U.S.C. § 119(a) to Japanese Patent Application No. 2014-200463 filed on Sep. 30, 2014. Each of the above applications is hereby expressly incorporated by reference, in their entirety, into the present application.

BACKGROUND OF THE INVENTION

1. Field of the Invention

The present invention relates to an image reading device and an image reading method that are used for reading of a printed material, a reading area display device, a reading area display method, and a program.

2. Description of the Related Art

In the field of printing, a correspondence relationship between colors of manuscript image data and a printed material on which an image has been printed on the basis of the manuscript image data is obtained in order to evaluate color reproduction of the printed material on which the image has been printed on the basis of the manuscript image data. This correspondence relationship is obtained by comparing a color distribution of the manuscript image data with a color distribution of read image data obtained by reading the printed material using a scanner (reading unit).

In recent years, in a case where reading of a printed material is performed using a scanner, a size of the printed material may be larger than a reading range (also referred to as a reading area) in which the printed material can be read by the scanner. In this case, generally, the printed material is divided into a plurality of areas, each area is read by the scanner to acquire area read image data for each area, and then pieces of the area read image data are combined to obtain read image data of the entire printed material.

JP2012-160957A discloses an image reading device that compares degrees of inclination between area image data read for the first time and area image data read for the second time and subsequent times to prevent a blank portion from being generated in an image based on the read image data after combination.

JP2010-068381A discloses an image reading device that combines area read image data for each area using a cover sheet on which a grid indicating position information of the plurality of areas described above is printed with a dropout color. The image reading device of JP2010-068381A performs switching between two types of illumination lights with which an image including a dropout color and an image not including the dropout color can be acquired when causing the cover sheet to overlap the printed material and then reading each area using a scanner. Thus, the image reading device of JP2010-068381A can acquire area read image data for each area including the grid printed with the dropout color and area read image data for each area not including the grid. The image reading device of JP2010-068381A combines the area read image data of each area not including the grid on the basis of the position information acquired from the area read image data of each area including the grid to obtain the read image data of the entire printed material.

According to this image reading device described in JP2012-160957A and JP2010-068381A, even in a case where a size of the printed material is larger than the reading range of the scanner, the printed material is divided into a plurality of areas and each area is read by the scanner so as to obtain read image data of the entire printed material. Thus, it is possible to analyze the read image data of the printed material to obtain a color distribution, and a correspondence relationship between colors of the manuscript image data and the printed material is obtained by comparing a color distribution of the read image data with a color distribution of the manuscript image data.

SUMMARY OF THE INVENTION

However, the correspondence relationship between the colors of the manuscript image data and the printed material can be obtained from a color distribution of read image data (the above-described area read image data) of an area of a portion of the printed material without obtaining the color distribution of the read image data of the entire printed material. Therefore, it is not necessary to obtain the read image data of the entire printed material unlike the image reading device described in JP2012-160957A and JP2010-068381A, and conversely, efforts or time is required to obtain the read image data of the entire printed material.

Further, in the image reading device described in JP2010-068381A, since the cover sheet on which the grid of drop out color has been printed is used, printed material information immediately under the grid is highly likely to be missing from the read image data. Further, when the cover sheet overlaps a thick printed material, a gap is generated between the printed material and the cover sheet and accurate position information may not be obtained.

Therefore, in a case where a correspondence relationship between colors of the manuscript image data and the printed material is established, it is preferable for an optimum reading area of a portion of the printed material suitable for establishment of the correspondence relationship between the colors to be read by a scanner and for a color distribution of read image data of the scanner to be obtained. However, the optimum reading area may not be necessarily easily discriminated from the image printed on the printed material, and in some cases, it is necessary to repeat reading in the scanner several times while changing the reading area. Further, an area including an important color such as a corporate color or a skin color of a person is usually selected as the optimum reading area, but the important color is often different according to a user or a printed material. As a result, it is necessary to change the optimum reading area according to a user or a printed material, and it is not possible to simply determine the optimum reading area.

The present invention has been made in view of such circumstances, and an object thereof is to provide an image reading device and method capable of efficiently performing reading of a printed material, a reading area display device and method, and a program.

In order to achieve the object of the present invention, there is provided an image reading device according to an aspect of the invention, the device comprising: a reading unit that performs reading of a printed material on which an image is printed on the basis of manuscript image data; a first image analysis unit that analyzes a color distribution of the manuscript image data; a reading area setting unit that sets a reading area in which the reading unit performs reading of the printed material, on the basis of a result of the analysis of the color distribution of the manuscript image data by the first image analysis unit, and sets at least one or more areas satisfying an allowable condition determined for a color distribution in advance in the manuscript image data as the reading area; and a display unit that displays a setting position of the printed material with respect to the reading unit on the basis of a result of the setting of the reading area by the reading area setting unit, in which the reading unit performs reading of the printed material set in the reading unit after the setting position is displayed by the display unit.

According to the present invention, it is possible to indicate a reading area satisfying the allowable condition determined for the color distribution in advance in the manuscript image data to the user. Accordingly, it is not necessary for the reading by the reading unit to be repeated several times while changing the reading area of the printed material, and it is possible to perform reading of the reading area satisfying the above-described allowable condition in a short time (about once). Further, it is possible to display the reading area according to users or printed materials by changing the allowable condition according to the users or the printed materials.

In the image reading device according to another aspect of the present invention, the reading unit performs reading of the printed material that is larger than a reading range in which the reading unit is capable of reading the printed material. Thus, when the reading unit performs reading of the printed material larger than the reading range, it is possible to indicate a reading area satisfying the allowable condition determined for the color distribution in advance in the manuscript image data to the user.

In the image reading device according to still another aspect of the present invention, the display unit displays the setting position to be overlapped on a reduced image generated on the basis of the manuscript image data. Thus, it is possible to indicate a reading area satisfying the allowable condition determined for the color distribution in advance in the manuscript image data to the user.

In the image reading device according to still another aspect of the present invention, the display unit selects and displays an area corresponding to the reading area in an image based on the manuscript image data. Thus, it is possible to indicate a reading area satisfying the allowable condition determined for the color distribution in advance in the manuscript image data to the user.

In the image reading device according to still another aspect of the present invention, the first image analysis unit extracts, for each pixel, a pixel having a predetermined specific color from the manuscript image data to generate a list in which the specific color and a pixel position of a pixel having the specific color are associated, and the reading area setting unit sets a plurality of candidate areas that are candidates of the reading area in the manuscript image data, and sets the candidate area including at least the pixel in the list among the plurality of candidate areas as the reading area. Accordingly, it is possible to automatically set the reading area satisfying the allowable condition determined for the color distribution in advance in the manuscript image data.

In the image reading device according to still another aspect of the present invention, the reading area setting unit sets the candidate area including a largest number of pixels in the list among the plurality of candidate areas, as the reading area. Accordingly, it is possible to set an optimum candidate area among a plurality of candidate areas as the reading area.

In the image reading device according to still another aspect of the present invention, the specific color includes at least one of an important color, a chroma color, or a gray color that are determined in advance.

The image reading device according to still another aspect of the present invention further comprises: a second image analysis unit that analyzes a color distribution of the read image data of the printed material read by the reading unit; and a re-reading determination unit that compares a result of the analysis of the color distribution of the read image data by the second image analysis unit with the analysis result of the color distribution of the manuscript image data by the first image analysis unit to determine whether or not there is execution of re-reading of the printed material by the reading unit. Accordingly, it is possible to automatically determine that reading of the printed material by the reading unit is not correctly performed due to causes such as the printed material being not correctly set at the setting position of the reading unit.

The image reading device according to still another aspect of the present invention further comprises: a second image analysis unit that analyzes a color distribution of the read image data of the printed material read by the reading unit; and a re-reading determination unit that compares a result of the analysis of the color distribution of the read image data by the second image analysis unit with the analysis result of the color distribution of the manuscript image data by the first image analysis unit to determine whether or not there is execution of re-reading of the printed material by the reading unit, in which the second image analysis unit analyzes the color distribution of the read image data and counts the number of colors of which a color difference with the specific color is within a range of a predetermined threshold value, and the re-reading determination unit determines non-execution of the re-reading in a case where the number of colors counted by the second image analysis unit satisfies a predetermined certain rate with respect to the number of specific colors registered in the list, and determines execution of the re-reading in a case where the number of colors does not satisfy the certain rate. Accordingly, it is possible to automatically determine that reading of the printed material by the reading unit is not correctly performed due to causes such as the printed material being not correctly set at the setting position of the reading unit.

In the image reading device according to still another aspect of the present invention, the manuscript image data is image data of a first color space, and the read image data is image data of a second color space, the image reading device further comprises a registration unit that performs a registration process of specifying a positional relationship between the read image data read by the reading unit and the manuscript image data; and a color extraction unit that acquires color information from an image position at which the read image data and the manuscript image data correspond to each other after the registration process, and the second image analysis unit analyzes the color distribution in the first color space of the read image data on the basis of the color information extracted by the color extraction unit. Thus, when the color distribution of the read image data is analyzed in the second image analysis unit, the color difference determination is prevented from being affected by a difference in color gamut between the manuscript image data and the read image data.

An image reading method for achieving the object of the present invention is an image reading method of performing reading of a printed material using a reading unit that performs reading of a printed material on which an image is printed on the basis of manuscript image data, the image reading method comprising: a first image analysis step of analyzing a color distribution of the manuscript image data; a reading area setting step of setting a reading area in which the reading unit performs reading of the printed material, on the basis of a result of the analysis of the color distribution of the manuscript image data in the first image analysis step, and setting at least one or more areas satisfying an allowable condition determined for a color distribution in advance in the manuscript image data as the reading area; a display step of displaying a setting position of the printed material with respect to the reading unit on the basis of a result of the setting of the reading area in the reading area setting step; and a reading step of performing reading of the printed material set in the reading unit after the setting position is displayed in the display step.

A reading area display device for achieving the object of the present invention is a reading area display device that displays a reading area of a printed material when reading of the printed material is performed by a reading unit that performs reading of the printed material on which an image is printed on the basis of manuscript image data, the reading area display device comprising: a first image analysis unit that analyzes a color distribution of the manuscript image data; a reading area setting unit that sets a reading area in which the reading unit performs reading of the printed material, on the basis of a result of the analysis of the color distribution of the manuscript image data by the first image analysis unit, and sets at least one or more areas satisfying an allowable condition determined for a color distribution in advance in the manuscript image data as the reading area; and a display unit that displays a setting position of the printed material with respect to the reading unit on the basis of a result of the setting of the reading area by the reading area setting unit.

A reading area display method for achieving the object of the present invention is a reading area display method of displaying a reading area of a printed material when reading of the printed material is performed by a reading unit that performs reading of the printed material on which an image is printed on the basis of manuscript image data, the reading area display method comprising: a first image analysis step of analyzing a color distribution of the manuscript image data; a reading area setting step of setting a reading area in which the reading unit performs reading of the printed material, on the basis of a result of the analysis of the color distribution of the manuscript image data in the first image analysis step, and setting at least one or more areas satisfying an allowable condition determined for a color distribution in advance in the manuscript image data as the reading area; and a display step of displaying a setting position of the printed material with respect to the reading unit on the basis of a result of the setting of the reading area in the reading area setting step.

A program for achieving the object of the present invention is a program for causing a computer to function as means for displaying a reading area of a printed material when reading of the printed material is performed by a reading unit that performs reading of the printed material on which an image is printed on the basis of manuscript image data, the program causing the computer to function as: a first image analysis unit that analyzes a color distribution of the manuscript image data; a reading area setting unit that sets a reading area in which the reading unit performs reading of the printed material, on the basis of a result of the analysis of the color distribution of the manuscript image data by the first image analysis unit, and sets at least one or more areas satisfying an allowable condition determined for a color distribution in advance in the manuscript image data as the reading area; and a display unit that displays a setting position of the printed material with respect to the reading unit on the basis of a result of the setting of the reading area by the reading area setting unit. A computer-readable medium having this program recorded thereon is also included in the present invention.

According to the image reading device and method, the reading area display device and method, and the program of the present invention, it is possible to efficiently perform reading of the printed material.

BRIEF DESCRIPTION OF THE DRAWINGS

FIG. 2 is an illustrative diagram illustrating an example of list data.

FIG. 19 is an illustrative diagram illustrating an example of color number totaling data.

DESCRIPTION OF THE PREFERRED EMBODIMENTS

[Image Reading Device According to First Embodiment]

Figure 1:
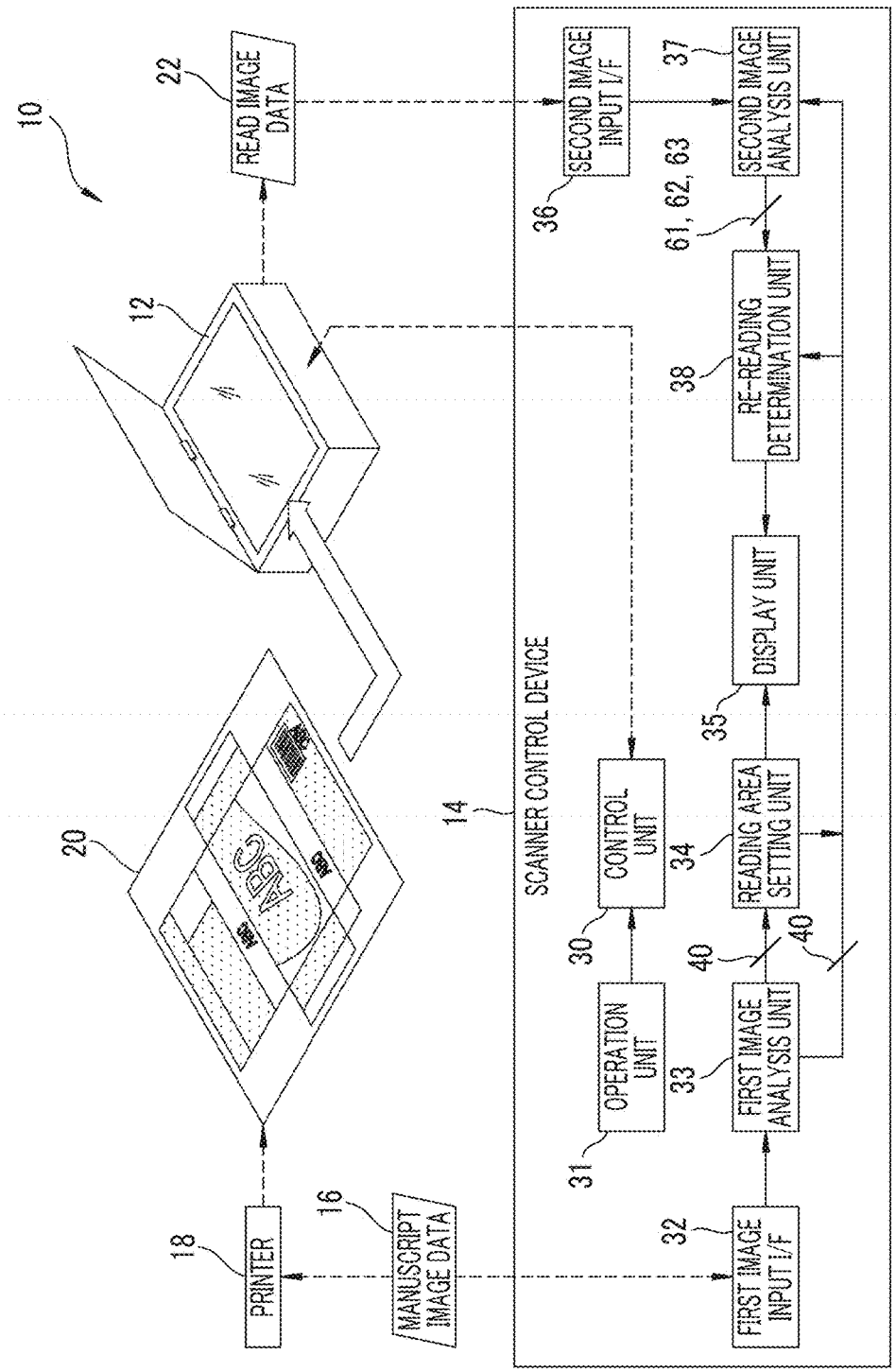
FIG. 1 is a schematic diagram illustrating an entire configuration of an image reading device according to a first embodiment.

FIG. 1 is a schematic diagram illustrating an entire configuration of an image reading device 10 according to a first embodiment. As illustrated in FIG. 1, the image reading device 10 roughly includes a scanner 12 corresponding to a reading unit of the present invention, and a scanner control device 14 corresponding to a reading area display device of the present invention.

Under the control of the scanner control device 14, the scanner 12 performs reading (also referred to as scan) of a printed material 20 on which an image has been printed by a printer 18 on the basis of manuscript image data 16 to generate and outputs read image data 22 of the printed material 20. In FIG. 1, an example of the scanner 12 includes a stationary scanner, but various known types of scanners may be used.

A size of the printed material 20 is formed to be larger than a reading range in which the printed material is readable in a reading surface (glass surface) of the scanner 12. Therefore, an area of a portion of the printed material 20 is selected and set on the reading surface of the scanner 12. The read image data 22 obtained through one reading in the scanner 12 is read image data corresponding to the area of the portion of the printed material 20. Various printing schemes such as an inkjet printing scheme or a flexographic printing scheme may be adopted as a printing format for the printed material 20 in the printer 18.

<Configuration of Scanner Control Device>

The scanner control device 14 includes, for example, a personal computer and a monitor. The scanner control device 14 controls reading of the printed material 20 by the scanner 12. Further, the scanner control device 14 executes a display of the reading area when the scanner 12 reads the printed material 20, and a determination as to whether or not re-rereading the printed material 20 by the scanner 12 is executed.

The scanner control device 14 includes a control unit 30, an operation unit 31, a first image input I/F (interface) 32, a first image analysis unit 33, a reading area setting unit 34, a display unit 35, a second image input I/F 36, a second image analysis unit 37, and a re-reading determination unit 38.

For the control unit 30, for example, a central processing unit (CPU) or the like is used. The control unit 30 appropriately executes a program read from a memory (not illustrated) or the like according to an input instruction of the operation unit 31, to control an operation of each unit of the scanner control device 14 and a reading operation of the scanner 12. As the operation unit 31, for example, a keyboard, a mouse, an operation key, a touch panel, or the like may be used.

The first image input I/F 32 functions as an image acquisition unit that acquires manuscript image data 16 from the outside of the image reading device 10. For example, in a case where the manuscript image data 16 is recorded on an information recording medium such as a memory card, a reading I/F is used as the first image input I/F 32. Further, in a case where the manuscript image data 16 is stored in a server on a network, various storage units, or the like, a communication I/F is used as the first image input I/F 32. The first image input I/F 32 outputs the manuscript image data 16 to the first image analysis unit 33.

<Color Distribution Analysis of Manuscript Image Data>

The first image analysis unit 33 performs analysis of color distribution of the manuscript image data 16 input from the first image input I/F 32 to generate list data 40 indicating a result of the analysis.

The list data 40 is data in which coordinates and Lab values of pixels having a specific color corresponding to predetermined conditions among the pixels of the manuscript image data 16 are listed (see FIG. 2). In this embodiment, an important color, a high chroma color of which chroma is equal to or larger than a predetermined threshold value, and a gray color are determined as the specific color, but the present invention is not limited to the colors. Here, the important color is, for example, specific color that is used in a special color plate other than cyan (C), magenta (M), yellow (Y), and black (K), a corporate color registered in advance, or a fresh color.

For each pixel of the manuscript image data 16, the first image analysis unit 33 determines whether or not colors of the pixels correspond to an important color, a high chroma color, and a gray color, respectively, in an order (order of the important color, the high chroma color, and the gray color). The first image analysis unit 33 registers coordinates corresponding to a pixel position of the pixel determined to be correspond to an important color, a high chroma color, or a gray color, and a Lab value of the pixel in the list data 40.

FIG. 2 is an illustrative diagram illustrating an example of the list data 40. As illustrated in FIG. 2, the list data 40 includes an important color list 40A, a high chroma list 40B, and a gray list 40C. In the important color list 40A, coordinates and a Lab value of each pixel with the important color among pixels of the manuscript image data 16 are registered. In the high chroma list 40B, coordinates and a Lab values of each pixel with the above-described high chroma color among the pixels (excluding the pixels of important color) of the manuscript image data 16 are registered. Further, in the gray list 40C, the coordinates and a Lab value of a pixel with each gray color among the pixels (excluding the pixels with the important color and the pixels with the high chroma color) of the manuscript image data 16 are registered. By referring to the list data 40, the color distribution of the manuscript image data 16 can be discriminated.

(List Data Generation Process)

Figure 3:
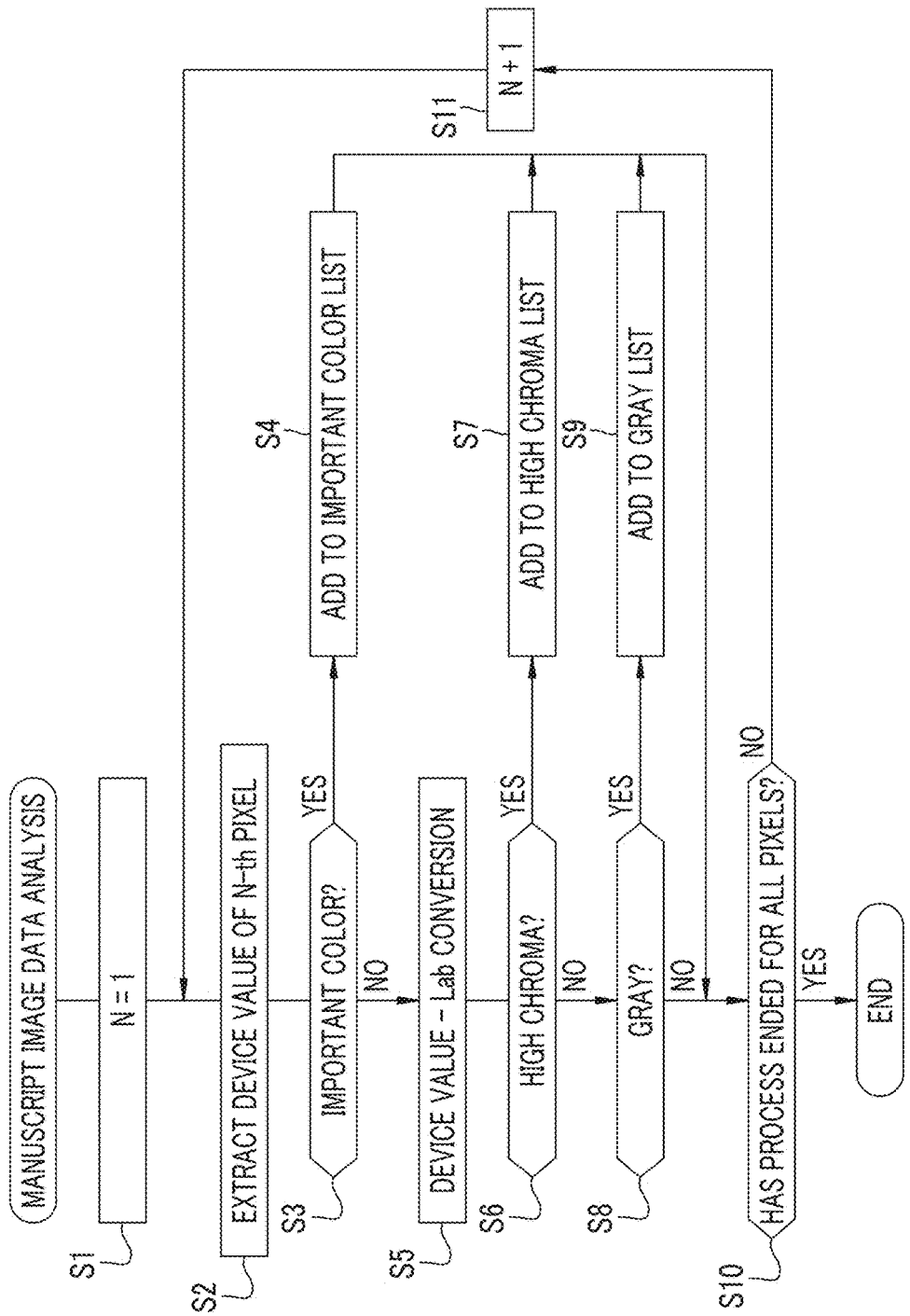
FIG. 3 is a flowchart illustrating a flow of a process of generating list data in a first image analysis unit.

FIG. 3 is a flowchart illustrating a flow of a process of generating the list data 40 in the first image analysis unit 33 (that is, a process of analyzing the color distribution of the manuscript image data 16). As illustrated in FIG. 3, the first image analysis unit 33 sets a pixel at a predetermined position among the pixels of the manuscript image data 16, for example, a pixel at one of four corners of the image, as a first pixel, and extracts a device value of the first pixel from the manuscript image data 16 (step S1 and step S2). Here, the device value is data defined as a CMYK value for appropriately driving various devices, or R (red) G (green) B (blue) value, or the like. In this embodiment, the device value is the CMYK value.

The first image analysis unit 33 determines whether or not the color of the first pixel is an important color on the basis of whether or not a device value (CMYK value) of the first pixel is within a range of the CMYK value corresponding to the important color described above (step S3). When the first image analysis unit 33 determines that the color of the first pixel is an important color, the first image analysis unit 33 converts the device value of the first pixel into a Lab value and then adds the coordinates and the Lab value of the first pixel to the important color list 40A (YES in step S3, and step S4).

Here, a JapanColor (registered trademark) profile, for example, is used for conversion of the device value (CMYK value) to the Lab value in the first image analysis unit 33. In a case where the device value is an RGB value, the first image analysis unit 33 converts the device value into a Lab value using a known profile such as a sRGB profile or an Adobe RGB profile.

On the other hand, if the first image analysis unit 33 determines that the color of the first pixel is not the important color (NO in step S3), the first image analysis unit 33 converts the device value (CMYK value) of the first pixel into the Lab value using the Japan Color (registered trademark) profile (step S5). Although NO is determined in step S3 and then step S5 is executed in this embodiment, the device value (CMYK value) may be converted to the Lab value before step S3.

Then, the first image analysis unit 33 determines whether or not the color of the first pixel is a high chroma color on the basis whether or not chroma of the first pixel is equal to or larger than a predetermined threshold value on the basis of the Lab value of the first pixel (step S6). In a case where the first image analysis unit 33 determines that the color of the first pixel is a high chroma color, the first image analysis unit 33 adds the coordinates and the Lab value of the first pixel to the high chroma list 40B (YES in step S6, and step S7).

Further, in a case where the first image analysis unit 33 determines that the color of the first pixel is not a high chroma color (NO in step S6), the first image analysis unit 33 determines whether or not the color of the first pixel is a gray color on the basis of whether or not the Lab value of the first pixel is within the range of the Lab values corresponding to a predetermined gray color (step S8). In a case where the first image analysis unit 33 determines that the color of the first pixel is a gray color, the first image analysis unit 33 adds the coordinates and the Lab value of the first pixel to the gray list 40C (YES in step S8, and step S9).

After the first image analysis unit 33 determines NO after step S9 or in step S8, the first image analysis unit 33 extracts the device value (CMYK value) of the second pixel from the manuscript image data 16 (NO in step S10, step S11, and step S2). The above-described process from step S3 to step S9 is executed again. Accordingly, when the first image analysis unit 33 determines that the color of the second pixel is any one of the important color, the high chroma color, and the gray color, the coordinates and the Lab value of the second pixel are added to the corresponding list among the important color list 40A, the high chroma list 40B, and the gray list 40C.

Hereinafter, similarly, the first image analysis unit 33 repeatedly executes the process from step S2 to step S9 for all the pixels of the manuscript image data 16 (YES in step S10). Thus, the coordinates and the Lab values of the pixels corresponding to the important color, the high chroma color, and the gray color among all the pixels of the manuscript image data 16 are added to the important color list 40A, the high chroma list 40B, and the gray list 40C, respectively.

Thus, the generation of the list data 40 in the first image analysis unit 33, that is, the analysis of the color distribution of the manuscript image data 16 ends. The first image analysis unit 33 outputs the list data 40 that is a result of the analysis of the color distribution of the manuscript image data 16 to the reading area setting unit 34, the second image analysis unit 37, and the re-reading determination unit 38 (see FIG. 1). Further, the first image analysis unit 33 outputs the manuscript image data 16 to the reading area setting unit 34.

(Other Examples of List Data Generation Process)

Figure 4:
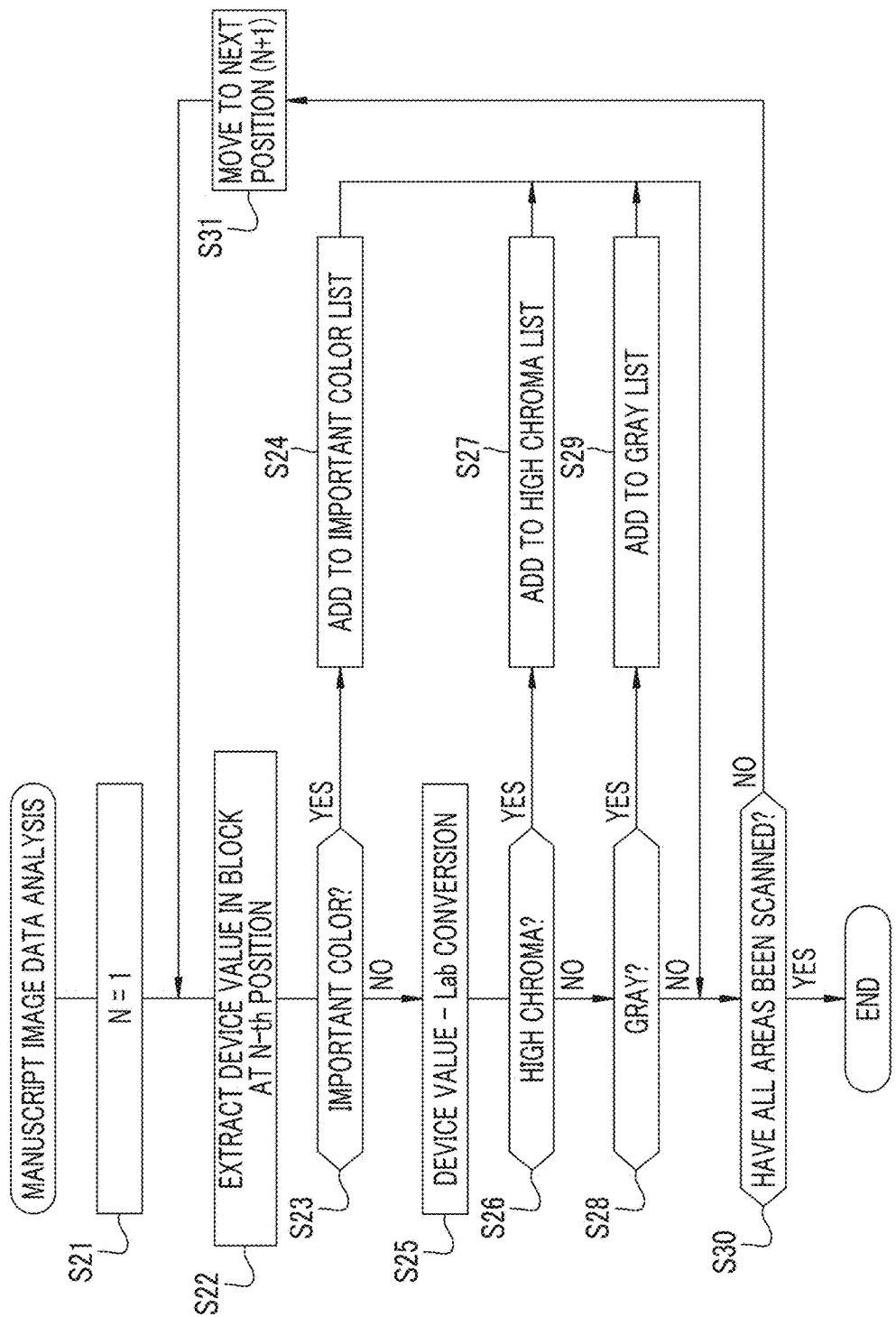
FIG. 4 is a flowchart illustrating a flow of another example of a process of generating list data in the first image analysis unit.

FIG. 4 is a flowchart illustrating a flow of another example of a process of generating the list data 40 in the first image analysis unit 33. In process of generating the list data 40 illustrated in FIG. 3 described above, a determination is performed in units of pixels of the manuscript image data 16, but in this case, a size of the list data 40 is increased. Thus, in another example, the determination is performed in units of blocks of tens of pixels in square. Specifically, the first image analysis unit 33 performs extraction of the device value in the block at each position to scan an entire area of the manuscript image data 16 while moving a position of the block on the manuscript image data 16.

The size of this block is, for example, 300 dpi (dots per inch) and a 5 mm in square (59 pixels in square), but may be set arbitrarily by the user or automatically set according to a size of the manuscript image data 16.

As illustrated in FIG. 4, the first image analysis unit 33 sets, for example, an upper left corner of the manuscript image data 16 as a position of the first block (step S21). The first image analysis unit 33 extracts the device value (CMYK value) of each pixel in the block at the first position from the manuscript image data 16, and obtains an average value or a maximum value of the device value of each pixel as a representative device value (CMYK value) of the block at the first position (step S22).

The first image analysis unit 33 determines whether or not the color in this block is an important color on the basis of whether or not the device value (CMYK value) of the block at the first position is in a range of CMYK values corresponding to the important color described above (step S23). In a case where the first image analysis unit 33 determines that the color within the block at the first position is an important color, the first image analysis unit 33 converts the device value (CMYK value) of this block into the Lab value and adds the coordinates and the Lab value to the important color list 40A (YES in step S23, and step S24). Here, the coordinates of the block are, for example, coordinates of each pixel in the block or coordinates of a representative pixel such as a center pixel.

On the other hand, in a case where the first image analysis unit 33 determines that the color within the block at the first position is not important color (NO in step S23), the first image analysis unit 33 converts the device value (CMYK value) of this block into the Lab value using a JapanColor (registered trademark) profile (step S25). As described above, the device value (CMYK value) may be converted to the Lab values prior to the determination in the step S23.

Then, the first image analysis unit 33 determines whether the color in this block is a high chroma color on the basis of whether the Lab value of the block at the first position is equal to or greater than a predetermined threshold value (step S26). In a case where the first image analysis unit 33 determines that the color in the block at the first position is a high chroma color, the first image analysis unit 33 adds the coordinates and the Lab values of this block to the high chroma list 40B (YES in step S26, and step S27).

Further, in a case where the first image analysis unit 33 determines that the color in the block at the first position is not a high chroma color (NO in step S26), the first image analysis unit 33 determines whether the color in this block is a gray color on the basis of whether or not the Lab value of the block is within a range of Lab values corresponding to a predetermined gray color (step S28). In a case where the first image analysis unit 33 determines that the color in the block at the first position is the gray color, the first image analysis unit 33 adds the coordinates and the Lab value of this block to the gray list 40C (YES in step S28, and step S29).

After the first image analysis unit 33 determines NO after step S29 or in step S28, the first image analysis unit 33 moves the position of the block to a second position, such as a position adjacent to the first position, on the manuscript image data 16 (step S31), and then, repeatedly executes the process from step S22 to step S29 described above.

Hereinafter, similarly, the first image analysis unit 33 repeatedly executes the process from step S22 to step S29 described above while changing the position of the block (NO in step S30, and step S31). That is, the first image analysis unit 33 performs extraction of the device value of each block subsequent to the second position and determines whether the color in each block corresponds to any of the important color, the high chroma color, and the gray color. Each time the first image analysis unit 33 determines that the color in each block corresponds to any of the important color, the high chroma color, and the gray color, the first image analysis unit 33 adds the coordinates and the Lab value of the determined block to the corresponding list among the important color list 40A, the high chroma list 40B, and the gray list 40C.

If the total area of the manuscript image data 16 is scanned in a block, the analysis of the color distribution in units of blocks of the manuscript image data 16 by the first image analysis unit 33 ends, and the list data 40 indicating a result of the analysis of the color distribution is generated (YES in step S30).

<Setting of Reading Area>

Referring back to FIG. 1, the reading area setting unit 34 an area satisfying an allowable condition predetermined for the color distribution in the manuscript image data 16 as a reading area when the reading of the printed material 20 is performed by the scanner 12 on the basis of the manuscript image data 16 and the list data 40 input from the first image analysis unit 33. This reading area is an area of the printed material 20 that is set on the reading surface of the scanner 12.

Specifically, the reading area setting unit 34 sets a plurality of candidate areas that are candidates of the reading area in the manuscript image data 16, and sets the candidate area including a largest number of pixels in the list data 40 among the candidate areas as the reading area. Therefore, the allowable condition in this case is that the largest number of pixels in the list data 40 is included. The allowable condition when analysis of the color distribution of the manuscript image data 16 is performed in units of blocks is that a largest number of blocks in the list data 40 is included.

FIGS. 5 to 8 are illustrative diagrams illustrating setting of a reading area (candidate area) in the reading area setting unit 34.

Figure 5:
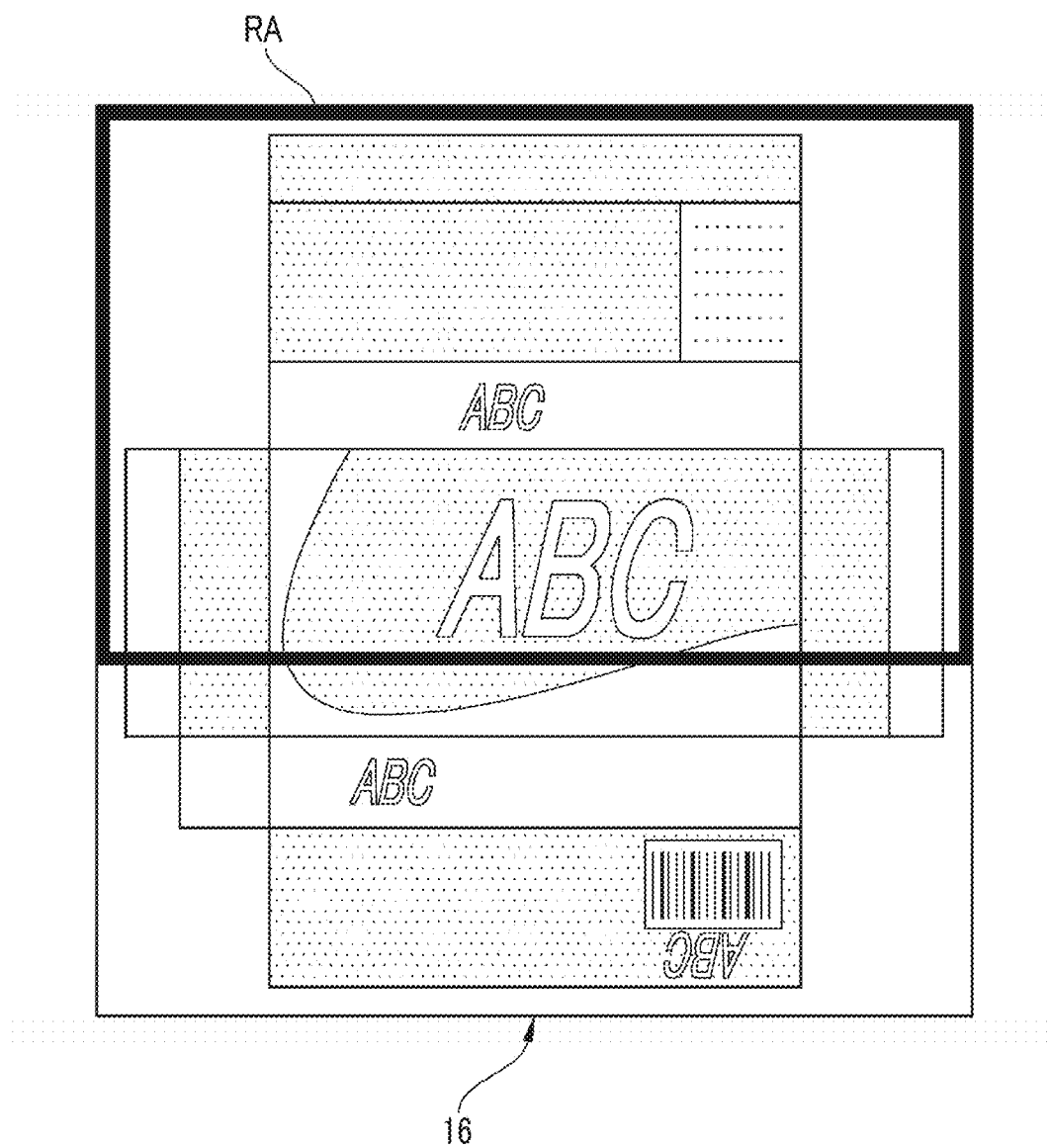
FIG. 5 is an illustrative diagram illustrating setting of a first candidate area by a reading area setting unit.

As illustrated in FIG. 5, the reading area setting unit 34 sets, in the manuscript image data 16, a first candidate area RA coming in contact with the outer periphery of the manuscript image, starting from one (an upper left corner) of four corners of the manuscript image based on the manuscript image data 16. Here, each candidate area including the first candidate area RA is set with a size of the reading surface that is a maximum reading size of the scanner 12. Further, each candidate area is set in an area in which the printed material 20 is not brought into contact with a hinge supporting a top plate of the scanner 12 and does not interfere with the set when the printed material 20 is set on the reading surface of the scanner 12, which is an area brought into contact with the outer periphery of the manuscript image.

Although the candidate area is set to be brought into contact with the outer periphery of the manuscript image a size of the manuscript image) in this embodiment, data of an area finally removed from the printed material 20, such as a crop mark that is a marker indicating a reference position, is included in the manuscript image data 16. In this case, an area coming in contact with the outer periphery of an effective image in the manuscript image may be set as a candidate area for the manuscript image data 16.

The reading area setting unit 34 analyzes the color distribution of the first candidate area RA of the manuscript image data 16 using the same scheme as in the first image analysis unit 33 described above (see FIG. 3), and counts the number of pixels included in the list data 40 in the first candidate area RA.

Figure 6:
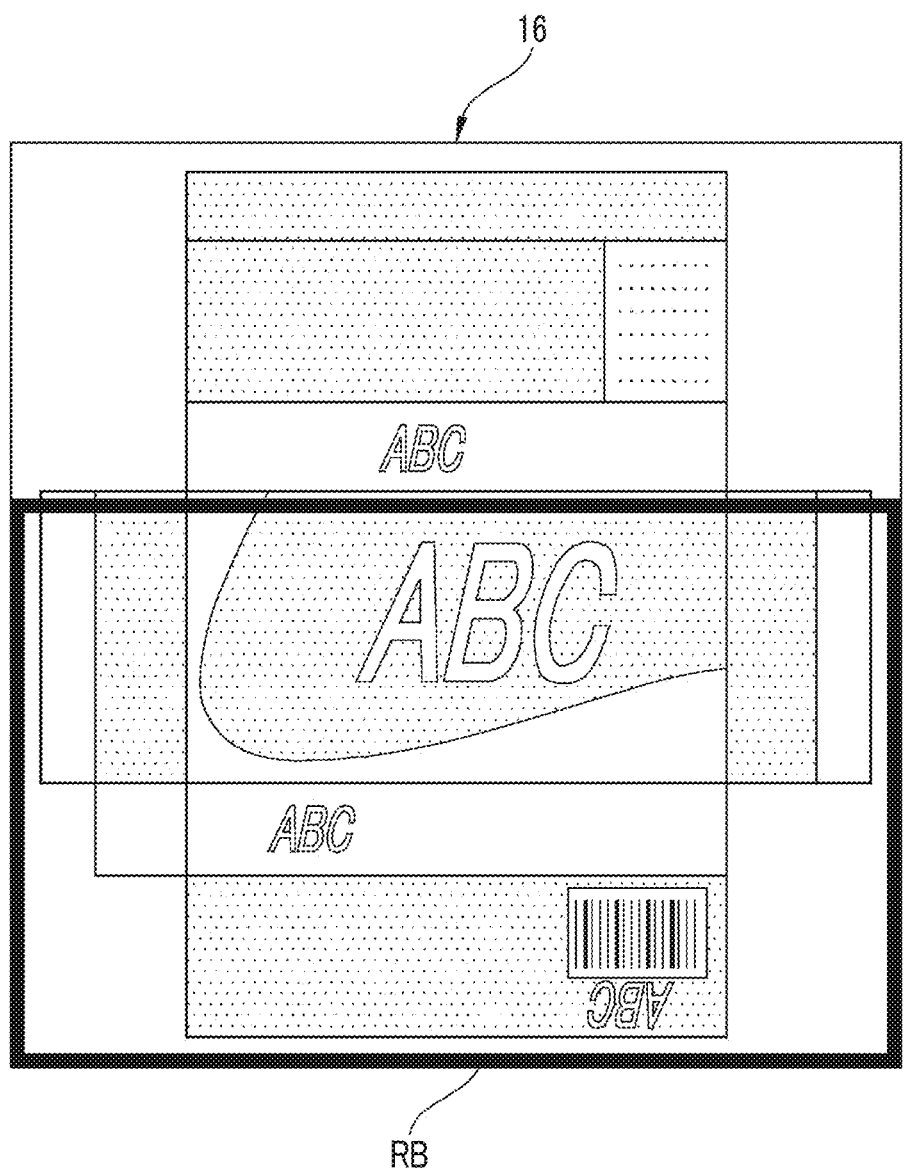
FIG. 6 is an illustrative diagram illustrating setting of a second candidate area by a reading area setting unit.

Then, as illustrated in FIG. 6, the reading area setting unit 34 sets a second candidate area RB that is brought into contact with an outer periphery of the manuscript image, in the manuscript image data 16, starting from a lower left corner of the manuscript image based on the manuscript image data 16. After this setting, the reading area setting unit 34 analyzes a color distribution of the second candidate area RB of the manuscript image data 16, and counts the number of pixels included in the list data 40 within the second candidate area RB.

Figure 7:
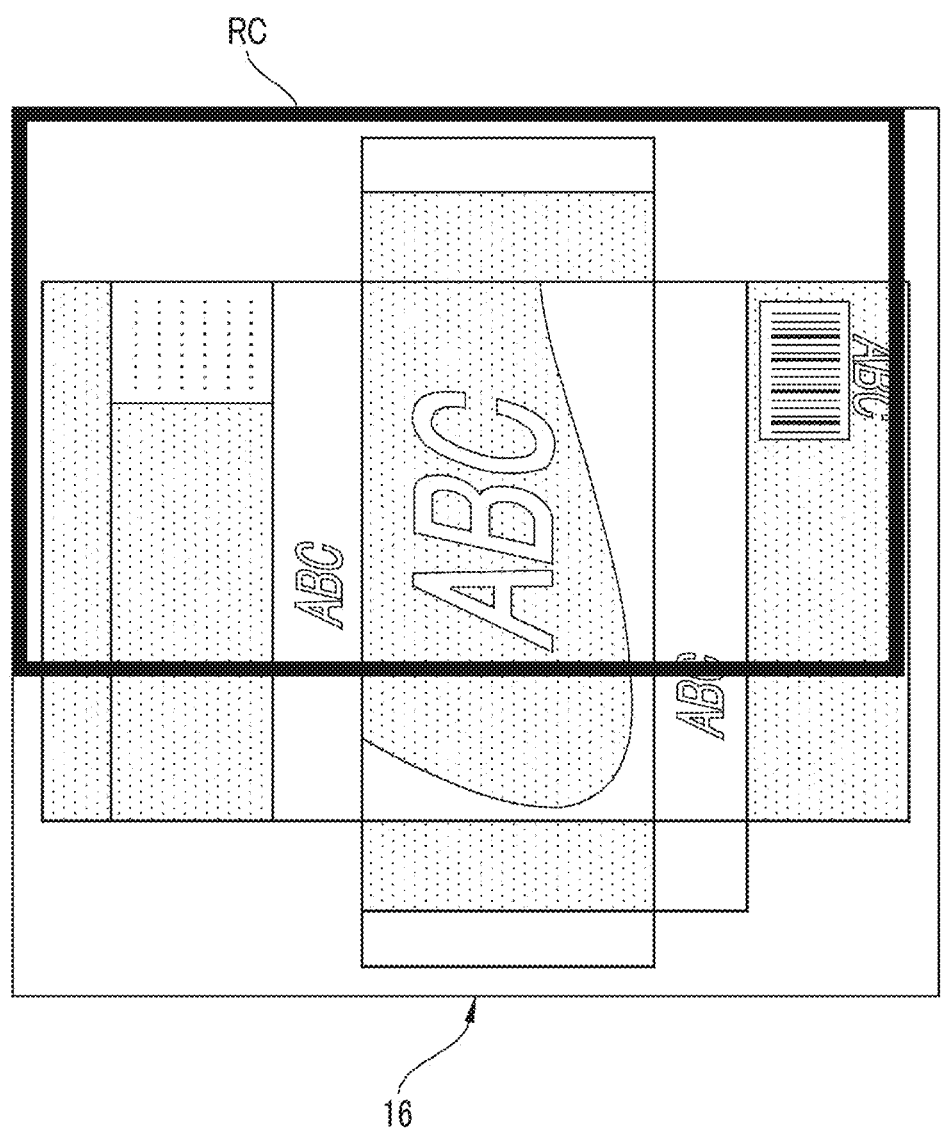
FIG. 7 is an illustrative diagram illustrating setting of a third candidate area by a reading area setting unit.

As illustrated in FIG. 7, the reading area setting unit 34 rotates the manuscript image data 16 by 90° in a clockwise direction, and sets a third candidate area RC which is in contact with the outer periphery of the manuscript image as the manuscript image data 16, starting from an upper left corner of the manuscript image after rotation. After this setting, the reading area setting unit 34 analyzes a color distribution of a third candidate area RC of the manuscript image data 16, and counts the number of pixels included in the list data 40 within the third candidate area RC.

Figure 8:
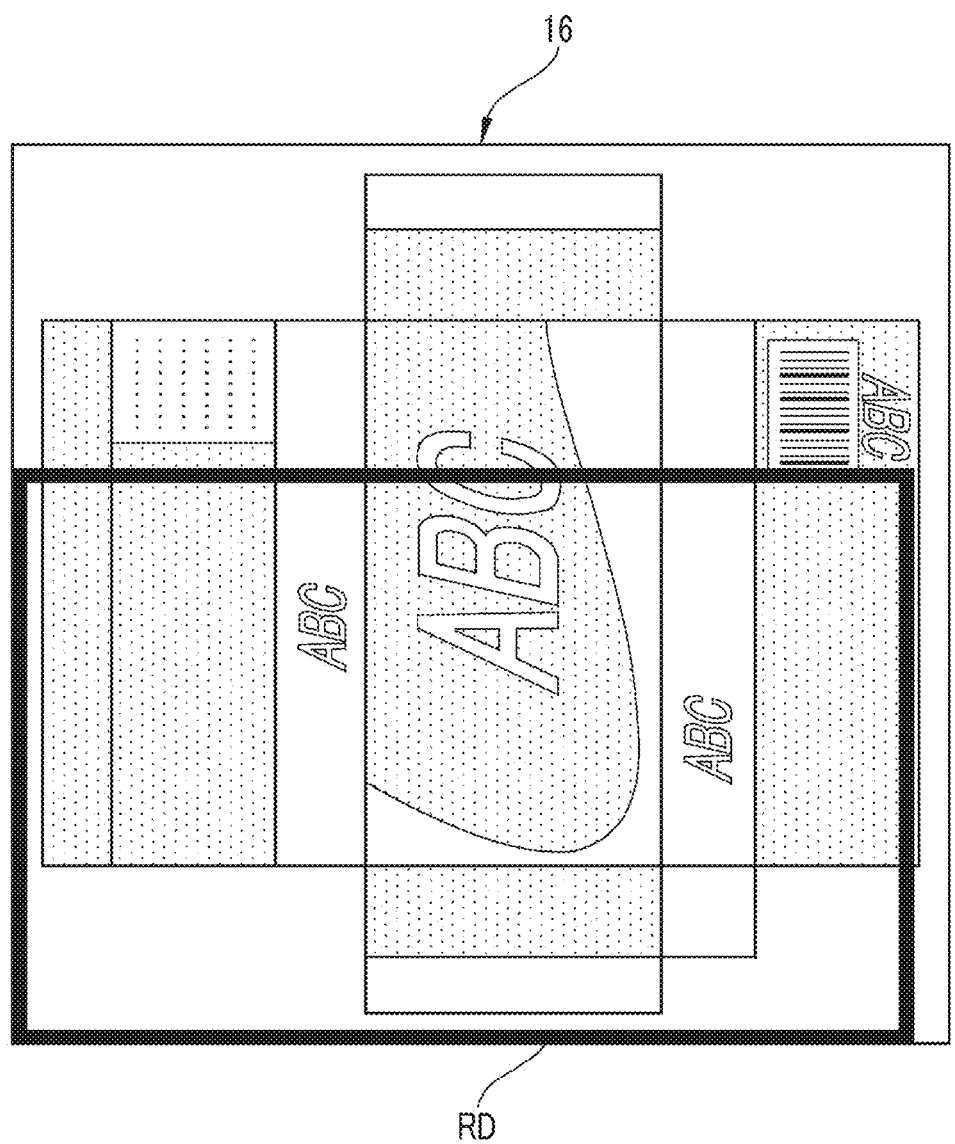
FIG. 8 is an illustrative diagram illustrating setting of a fourth candidate area by a reading area setting unit.

Then, as illustrated in FIG. 8, the reading area setting unit 34 sets a fourth candidate area RD that is brought into contact with an outer periphery of the manuscript image, in the manuscript image data 16, staring from a lower left corner of the manuscript image based on the manuscript image data 16. After this setting, the reading area setting unit 34 analyzes a color distribution of the fourth candidate area RD of the manuscript image data 16, and counts the number of pixels included in the list data 40 within the fourth candidate area RD.

Hereinafter, similarly, the reading area setting unit 34 rotates the manuscript image data 16 by 180° and 270° in a clockwise direction on the basis of an initial position of the manuscript image data 16, and sets a candidate area in the manuscript image data 16, starting from an upper left corner and a lower left corner of the manuscript image at the respective rotational positions. The reading area setting unit 34 counts the number of pixels included in the list data 40 in each set candidate area. Thus, the number of pixels included in the list data 40 within a total of eight candidate areas is counted.

Thus, the reading area setting unit 34 sets the candidate area including a largest number of pixels in the list data 40 in eight candidate areas (the first candidate area RA, the second candidate area RB, . . . ), as the reading area. Thereafter, the reading area setting unit 34 outputs a result of the setting of the reading area to the display unit 35, and the second image analysis unit 37 and the re-reading determination unit 38 to be described below. Further, the reading area setting unit 34 outputs the manuscript image data 16 to the display unit 35.

Although the above-described allowable condition are determined so that the candidate area including a largest number of pixels in the list data 40 is set as the reading area in this embodiment, the allowable condition may be changed so that one or more candidate areas including at least the pixels in the list data 40 are set as reading areas. Further, in a case where a plurality of candidate areas may be set as the reading area, the allowable condition may be changed so that the reading area is set from the candidate area including a large number of pixels with a color selected by the user from among the specific colors (important color, high chroma color, and a gray color). Further, although the specific color includes the important color, the high chroma color, and the gray color in this embodiment, paper white may be added as the specific color and the candidate area including at least the paper white may be set as the reading area.

Further, as illustrated in FIG. 4 described above, in a case where the first image analysis unit 33 analyzes the color distribution of the manuscript image data 16 in units of blocks, the allowable condition are set so that the candidate area including a largest number of blocks in the list data 40 among the respective candidate areas is set as the reading area. Further, in this case, the allowable conditions may be changed so that one or more candidate areas including the block in the list data 40 are set as reading areas.

<Reading Area Display>

Referring back to FIG. 1, the display unit 35 displays reading area display screen 50 (see FIG. 9) indicating a setting position of the printed material 20 with respect to the scanner 12, that is, the reading area of the printed material 20 on the basis of the manuscript image data 16 input from the reading area setting unit 34 and a result of the setting of the reading area.

Figure 9:
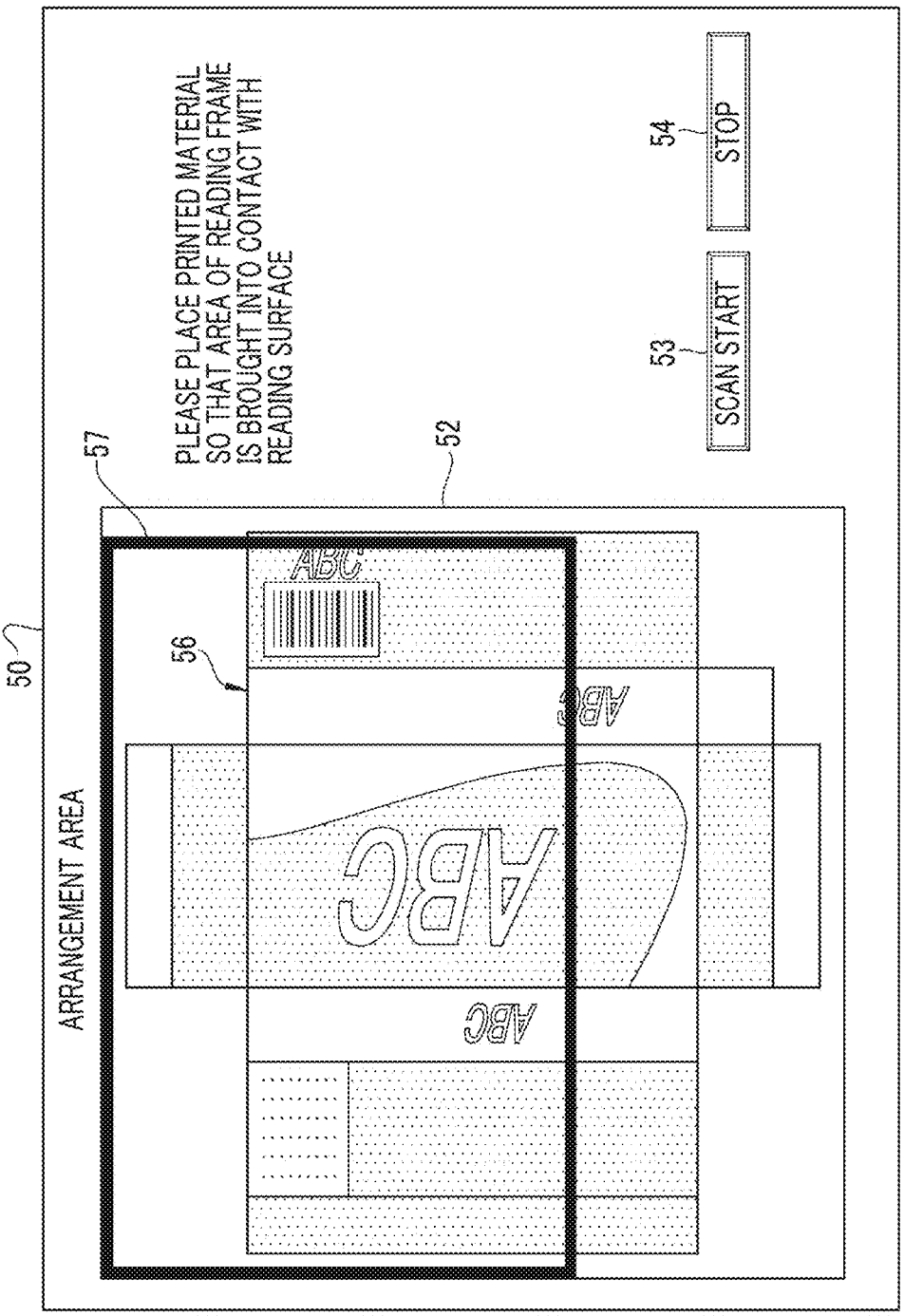
FIG. 9 is a front view of a reading area display screen.

FIG. 9 is a front view of the reading area display screen 50. As illustrated in FIG. 9, the reading area display screen 50 includes an image display field 52, a scan start button 53, a stop button 54, and a message for prompting setting of the printed material 20 in a predetermined position.

In the image display field 52, a reduced image based on reduced image data 56 generated from the manuscript image data 16, and a reading frame 57 indicating a setting position of the printed material 20 with respect to the scanner 12 are displayed. The display unit 35 generates the reduced image data 56 according to a size of the image display field 52 from the manuscript image data 16, and displays the reduced image based on the reduced image data 56 in the image display field 52. Further, the display unit 35 superimposes the reading frame 57 on the reduced image on the basis of a result of the setting of the reading area and displays these in the image display field 52. Thus, in the reading area display screen 50, the setting position of the printed material 20 with respect to the scanner 12, that is, the reading area of the printed material 20 is indicated to the user.

The scan start button 53 is a button for causes the scanner 12 to start the reading of the printed material 20. If the scan start button 53 is clicked, the scanner 12 performs the reading of the reading area of the printed material 20 to generate read image data 22 (RGB value) of the reading area under the control of the control unit 30. "Click" of the button also includes an operation corresponding to the button, such as touch.

The stop button 54 is a button for causes the scanner 12 to stop the reading of the printed material 20.

As described above, in a case where the reading area setting unit 34 sets a plurality of reading areas, for example, two reading areas, a display of a reading frame 57 corresponding to a first reading area is first performed. Then, after read image data in the first reading area is acquired, a reading frame 57 corresponding to the second reading area is displayed. The same applies a case where three or more reading areas are set.

(Other Examples of Reading Area Display Screen)

Figure 10:
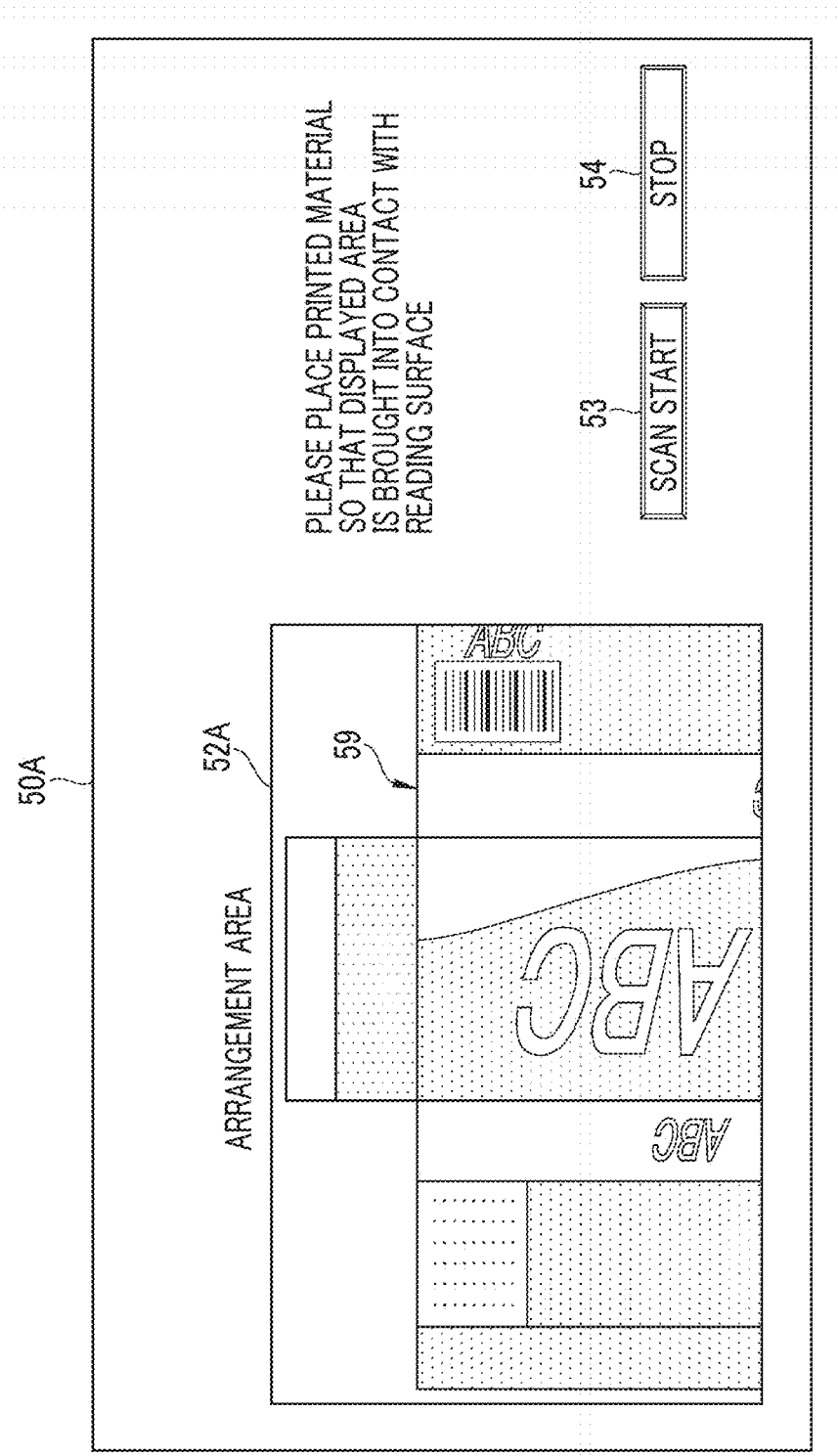
FIG. 10 is a front view of a reading area display screen that is another embodiment of the reading area display screen illustrated in FIG. 9.

FIG. 10 is a front view of a reading area display screen 50A that is another example of the reading area display screen 50 illustrated in FIG. 9. As illustrated in FIG. 10, in the reading area display screen 50A, only an area corresponding to the reading area in the manuscript image based on the manuscript image data 16 is displayed instead of the reduced image based on the reduced image data 56 described above being performed.

The reading area display screen 50A is basically the same as the reading area display screen 50 except that an image display field 52A different from the image display field 52 is included.

In the image display field 52A, an image of an area corresponding to the reading area in the manuscript image data 16 is displayed. The display unit 35 selects or cuts out reading area image data 59 corresponding to the reading area from the manuscript image data 16 on the basis of the manuscript image data 16 and a result of the setting of the reading area set by the reading area setting unit 34, and displays a reading area image based on the reading area image data 59 in the image display field 52A. In this case, the reading area image displayed in the image display field 52A indicates the setting position of the printed material 20 with respect to the scanner 12, that is, the reading area of the printed material 20.

<Re-Reading Determination Process>

Referring back to FIG. 1, the second image input I/F 36 functions as an image acquisition unit that acquires read image data 22 generated and output by the scanner 12. Various I/Fs may be used, as in the first image input I/F 32. In this embodiment, the scanner 12 and the second image input I/F 36 are connected by a wired or wireless communication network, and the read image data 22 generated by the scanner 12 is automatically input to the second image input I/F 36. Although the second image input I/F 36 is provided separately from the first image input I/F 32 in this embodiment, both may be integrally formed. The second image input I/F 36 outputs the read image data 22 to the second image analysis unit 37.

The second image analysis unit 37 analyzes the color distribution of the read image data 22 input from the second image input I/F 36 on the basis of the list data 40 input from the first image analysis unit 33 and a result of the setting of the reading area input from the reading area setting unit 34. First, the second image analysis unit 37 converts the RGB value of each pixel of the read image data 22 into the Lab value using a scanner profile determined for each type of scanner 12 in advance. The scanner profile is a color conversion table showing a correspondence relationship indicating between the RGB value that is a reading image signal value of a device-dependent color space obtained from the scanner 12 and the Lab value of a device-independent color space. The scanner profile is stored in the scanner control device 14 in advance.

Then, the second image analysis unit 37 performs analysis of the color distribution of the converted read image data 22 to obtain a color difference between the color of each pixel of the read image data 22 and specific color (important color, high chroma color, and a gray color) in the reading area registered in the list data 40, and counts the number of colors for which the color difference is within a predetermined range of a threshold value for each specific color.

Specifically, the second image analysis unit 37 discriminates a specific color in the reading area registered in the list data 40 on the basis of the result of setting of the reading area. That is, the second image analysis unit 37 discriminates an important color in the reading area among important colors registered in the important color list 40A, a high chroma color in the reading area among the high chroma colors registered in the high chroma list 40B, and a gray color in the reading area among the gray colors registered in the gray list 40C.

After this discrimination, the second image analysis unit 37 obtains a color difference between the color of each pixel and the important color in the reading area of the important color list 40A, and performs a color difference determination as to whether the color difference is within a predetermined threshold value. In this embodiment, for example, in a case where the color difference ΔE satisfies ΔE<10, the color difference is within the range of the threshold value and the color difference determination is OK, and in a case where ΔE≥10, the color difference is out of the range of the threshold value and the color difference determination is NG. In a case where the color difference determination result is OK, the second image analysis unit 37 adds the coordinates and the Lab value of the corresponding pixel to the read important color list 61.

Further, the second image analysis unit 37 performs a determination of a color difference between colors of the remaining pixels not added to the read important color list 61 and the high chroma color in the reading area in the high chroma list 40B, and adds the coordinates and the Lab value of the corresponding pixel to the read high-chroma list 62 in a case where a result of the color difference determination is OK. Thereafter, the second image analysis unit 37 performs a determination of a color difference between the colors of the remaining pixels and the gray color in the reading area in the gray list 40C, and adds the coordinates and the Lab value of the corresponding pixel to the read gray list 63 in a case where a result of the color difference determination is OK. Hereinafter, the "read important color list 61", the "read high-chroma list 62", and the "read gray list 63" are collectively appropriately abbreviated as a "read list".

As the number of colors registered in each read list is closer to the number of specific colors registered in each of the important color list 40A, the high chroma list 40B, and the gray list 40C described above (see FIG. 2), the color distribution of the read image data 22 is close to the color distribution of the reading area of the manuscript image data 16. Thus, the read list shows a result of the analysis of the color distribution of the read image data 22. The second image analysis unit 37 outputs the read list to the re-reading determination unit 38.

As illustrated in FIG. 4 described above, in a case where the first image analysis unit 33 analyzes the color distribution of the manuscript image data 16 in units of blocks, analysis of the color distribution of the read image data 22 in the second image analysis unit 37, that is, generation of the read list is also executed in units of blocks.

The re-reading determination unit 38 compares a read list that is a result of the analysis of the color distribution of the read image data 22 in the second image analysis unit 37 with the list data 40 that is a result of the analysis of the color distribution of the manuscript image data 16 in the first image analysis unit 33 described above to determine whether or not there is execution of the re-reading of the printed material 20 in the scanner 12.

Specifically, the re-reading determination unit 38 obtains the number of colors for each color of specific colors (important color, high chroma color, and gray color) included in the reading area of the manuscript image data 16 on the basis of the list data 40 input from the first image analysis unit 33 and a result of the setting of the reading area input from the reading area setting unit 34. Then, the re-reading determination unit 38 determines non-execution of re-reading of the printed material 20 in the scanner 12 in a case where the number of colors registered in each of the read lists satisfies a certain rate to the number of colors for each color of the specific colors in the reading area of the manuscript image data 16. The certain rate described herein is, for example, 80% or more in this embodiment. This certain rate may be changed according to quality (resolution, garbage, scratches of the printed material) at the time of reading of the scanner 12. For example, in a case where the quality (a small number of lines) of the printed material 20 is low because there are a lot of garbage on the surface of the printed material 20, the certain rate is set to a "low level (40%)". Further, the certain rate is set to a "normal level (60%)" or a "high quality level (80%)" according to the quality of the printed material 20.

On the other hand, in a case where the number of colors registered in at least one of the read lists does not satisfy a certain rate to the number of specific colors in the reading area of the manuscript image data 16, the re-reading determination unit 38 determines the execution of re-reading of the printed material 20 in the scanner 12. Thus, in a case where the reading of the printed material 20 by the scanner 12 is not correctly performed due to causes such as the reading area of the printed material 20 being not correctly set on the reading surface of the scanner 12, a determination that re-reading of the printed material 20 is executed is performed. Although execution of re-reading of the printed material 20 is determined in a case where at least one of the read lists does not satisfy a certain rate in this embodiment, the execution of re-reading of the printed material 20 may be determined in a case where a predetermined number of lists among the read lists do not satisfy the certain rate.

A method of comparing the number of colors registered in each of the read lists with the number of specific colors in the reading area of the manuscript image data 16 is not limited to the above-described method, and may be appropriately corrected. For example, the total number of colors registered in each of the read lists may be compared with total number of specific colors in the reading area of the manuscript image data 16 and it may be determined whether a certain rate of the former to the latter is satisfied.

Referring back to FIG. 1, the re-reading determination unit 38 outputs a result of the determination as to whether or not there is execution of re-reading of the printed material 20 in the scanner 12 to the display unit 35.

Figure 11:
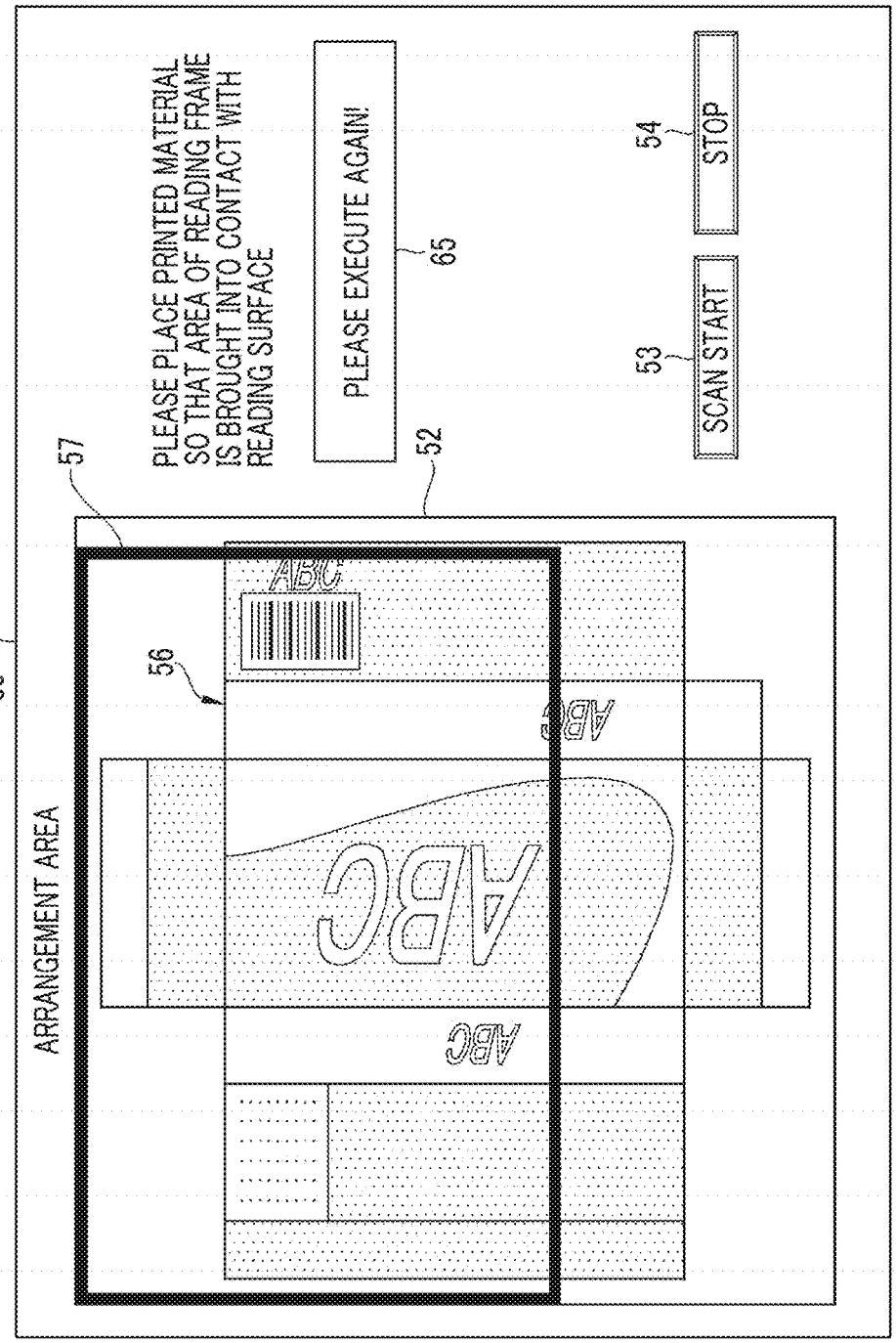
FIG. 11 is a front view of a reading area display screen in a case where execution of re-reading of a printed material in a scanner is determined by a re-reading determination unit.

FIG. 11 is a front view of the reading area display screen 50 in a case where the execution of re-reading of the printed material 20 in the scanner 12 is determined in the re-reading determination unit 38. As illustrated in FIG. 11, in a case where a determination result indicating that re-reading of the printed material 20 is executed is input from the re-reading determination unit 38, the display unit 35 performs a warning display indicating the fact. For example, the display unit 35 displays a warning message 65 on the reading area display screen 50. Content of the warning message 65 is not particularly limited. Further, a warning display method is not particularly limited. For example, a warning display through an audio display using a speaker or the like is performed instead of displaying the warning message 65 on the reading area display screen 50.

In the case where the determination result indicating that re-reading of the printed material 20 is not executed is input from the re-reading determination unit 38, the fact may be displayed in the reading area display screen 50.

[Operation of Image Reading Device of First Embodiment]

Figure 12:
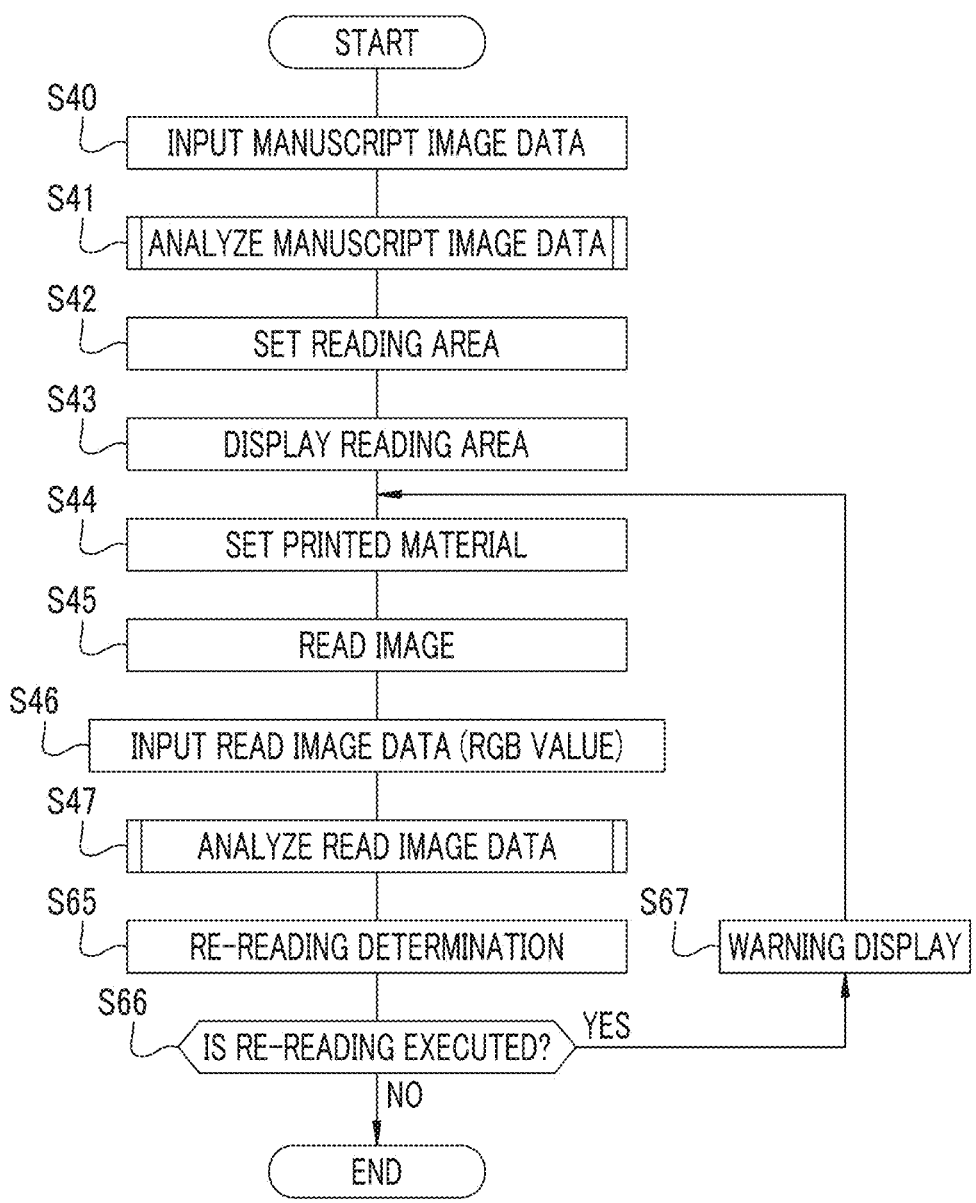
FIG. 12 is a flowchart illustrating a flow of a process of reading a printed material in an image reading device, and particularly, a flow of a process of displaying a reading area of the printed material.
Figure 13:
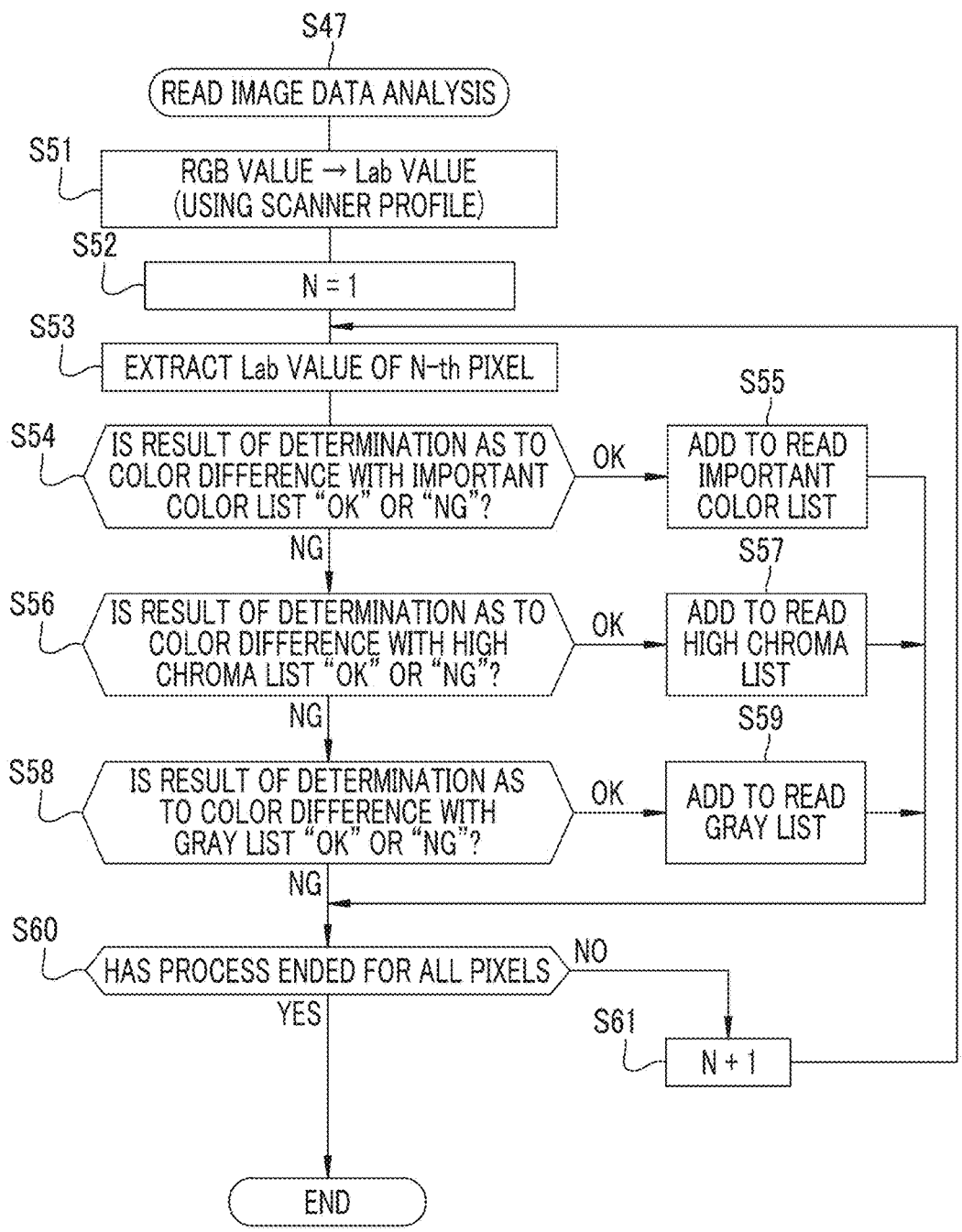
FIG. 13 is a flowchart illustrating a flow of a re-reading determination process of determining whether or not re-reading of the printed material is executed by a scanner.

Next, an operation of the image reading device 10 having the above configuration will be described with reference to FIGS. 12 and 13. FIG. 12 is a flowchart of a flow of a process of reading the printed material 20 in the image reading device 10 (image reading method), and particularly, a flow of a process of displaying the reading area of the printed material 20 (reading area display method). Further, FIG. 13 is a flowchart illustrating a flow of a re-reading determination process of determining whether or not re-reading of the printed material 20 is executed by the scanner 12.

<Reading Area Display Process>

As illustrated in FIG. 12, original manuscript image data 16 of the printed material 20 is input to the first image input I/F 32 of the scanner control device 14 before reading of the printed material 20 is performed by the scanner 12 (step S40). This manuscript image data 16 is input from the first image input I/F 32 to the first image analysis unit 33.

The first image analysis unit 33 analyzes the color distribution of the manuscript image data 16 for each pixel to generate the list data 40 having the important color list 40A, the high chroma list 40B, and the gray list 40C, as described with respect to FIG. 3 described above (step S41; corresponding to a first image analysis step of the present invention). As described in FIG. 4 described above, the first image analysis unit 33 may analyze the color distribution of the manuscript image data 16 in units of blocks and perform generation of the list data 40. The first image analysis unit 33 outputs the list data 40 that is a result of the analysis of the color distribution of the manuscript image data 16 to the reading area setting unit 34, the second image analysis unit 37, and the re-reading determination unit 38. Further, the first image analysis unit 33 outputs the manuscript image data 16 to the reading area setting unit 34.

Then, the reading area setting unit 34 sets a plurality of candidate areas (the first candidate area RA, the second candidate area RB, . . . ) that are candidates of the reading area in the manuscript image data 16, as described with reference to FIGS. 5 to 8 described above. The reading area setting unit 34 analyzes the color distribution in each candidate area, counts the number of pixels included in the list data 40 for each candidate area, and sets the candidate area including a largest number of pixels in the list data 40 in each candidate area, as the reading area (step S42; corresponding to a reading area setting step of the present invention). The reading area setting unit 34 outputs a result of setting of the reading area to the display unit 35, the second image analysis unit 37, and the re-reading determination unit 38. Further, the reading area setting unit 34 outputs the manuscript image data 16 to the display unit 35.

The display unit 35 displays the reading area display screen 50 on the basis of the manuscript image data 16 and a result of the setting of the reading area input from the reading area setting unit 34, as described with reference to FIG. 9 described above. In the image display field 52 of the reading area display screen 50, the reading frame 57 indicating the setting position of the printed material 20 (the reading area of the printed material 20) is superimposed on the reduced image based on the reduced image data 56 obtained by reducing the manuscript image data 16 and is displayed (step S43; corresponding to a display step of the present invention). Thus, the setting position of the printed material 20 (the reading area of the printed material 20) that is set on a reading face of the scanner 12 can be indicated to the user. The reading area display screen 50A illustrated in FIG. 10 may be displayed instead of the reading area display screen 50 being displayed.

After the setting position of the printed material 20 is displayed on the reading area display screen 50 by the display unit 35, the user sets the reading area of the printed material 20 on the reading face of the scanner 12 according to the display in the image display field 52 (step S44). Then, if the user operates the operation unit 31 and clicks the scan start button 53, the scanner 12 reads the reading area of the printed material 20 to generate the read image data 22 (RGB value) of the reading area under the control of the control unit 30 (step S45; corresponding to a reading step of the present invention).

<Flow of Re-Reading Determination Process>

Then, in the scanner control device 14, a re-reading determination process of determining whether or not there is execution of re-reading of the printed material 20 in the scanner 12 starts.

The read image data 22 (RGB value) generated by the scanner 12 is input from the scanner 12 to the second image input I/F 36, and is also input from the second image input I/F 36 to the second image analysis unit 37 (step S46). The analysis of the color distribution of the read image data 22 by the second image analysis unit 37 starts (step S47).

(Color Distribution Analysis of Read Image Data)

As illustrated in FIG. 13, the second image analysis unit 37 converts the read image data 22 (RGB value) input from the second image input I/F 36 into the Lab value using a scanner profile corresponding a model of the scanner 12 (step S51).

Further, the second image analysis unit 37 discriminates the specific color that is in the reading area among the specific colors (important color, high chroma color, and a gray color) registered in the important color list 40A, the high chroma list 40B, and the gray list 40C of the list data 40 input from the first image analysis unit 33 on the basis of the setting result of the reading area input from the reading area setting unit 34.

Then, the second image analysis unit 37 sets a pixel at a predetermined position among the pixels of the read image data 22 as a first pixel and extracts the Lab value of the first pixel from the read image data 22 (step S52 and step S53). The second image analysis unit 37 performs a color difference determination as to whether or not a color difference between the Lab value of the first pixel and the important color (Lab value) in the reading area registered in the important color list 40A is within a range of the threshold value (color difference $\Delta E<10$) (step S54). In a case where a result of the color difference determination is OK, the second image analysis unit 37 adds the coordinates and the Lab value of the first pixel to the read important color list 61 (step S55).

On the other hand, in a case where the color difference determination result is NG, the second image analysis unit 37 performs a determination as to a color difference between the Lab value of the first pixel and the high chroma color (Lab value) in the reading area registered in the high chroma list 40B (step S56). In a case where the color difference determination result is OK, the second image analysis unit 37 adds the coordinates and the Lab value of the first pixel to the read high-chroma list 62 (step S57).

In a case where the color difference determination result is NG, the second image analysis unit 37 performs determination as to a color difference between the Lab value of the first pixel and the gray color (Lab value) in the reading area registered in the gray list 40C (step S58). In a case where the color difference determination result is OK, the second image analysis unit 37 adds the coordinates and the Lab value of the first pixel to the read gray list 63 (step S59). On the other hand, in a case where the color difference determination result is NG, the second image analysis unit 37 ends the color difference determination for the color of the first pixel.

Then, the second image analysis unit 37 extracts the Lab value of the second pixel from the read image data 22 (NO in step S60, step S61, and step S53), and then, repeatedly executes the process from step S54 to step S59 described above. If a result of the determination as to the color difference between the Lab value of the second pixel and any one of the important color, the high chroma color, and the gray color in the reading area is OK, the color of the second pixel is added to the corresponding list among the read lists.

Hereinafter, similarly, the second image analysis unit 37 repeatedly executes the process from step S53 to step S59 for all the pixels of the read image data 22 (YES in step S60). Accordingly, the color difference determination is performed on the colors of all the pixels of the read image data 22. The coordinates and the Lab value of the pixel for which the color difference between the important color in the reading area and any one of the high chroma color and the gray color is within a range of a threshold value and the color difference determination result is OK are added to the corresponding list among the read lists. Then, the second image analysis unit 37 outputs the read list (the read important color list 61, the read high-chroma list 62, and the read gray list 63) that is a result of the analysis of the color distribution of the read image data 22 to the re-reading determination unit 38. Thus, the analysis of the color distribution of the read image data 22 ends.

(Re-Reading Determination Process)

Referring back to FIG. 12, if the read list is input from the second image analysis unit 37, the re-reading determination unit 38 starts a determination as to whether or not there is execution of re-reading of the printed material 20 in the scanner 12 (step S65).

First, the re-reading determination unit 38 obtains the number of colors for each color of the specific colors (important color, high chroma color, and a gray color) included in the reading area of the manuscript image data 16 on the basis of the list data 40 input from the first image analysis unit 33 and the result of the setting of the reading area input from the reading area setting unit 34.

Then, the re-reading determination unit 38 performs a determination as to whether the number of colors registered in the read important color list 61 satisfies a certain rate with respect to the number of colors of the important color in the reading area of the manuscript image data 16. Further, the re-reading determination unit 38 performs a determination as to whether the number of colors registered in the read high-chroma list 62 satisfies a certain rate with respect to the number of colors of the high chroma color in the reading area of the manuscript image data 16. Further, the re-reading determination unit 38 performs a determination as to whether the number of colors registered in the read gray list 63 satisfies a certain rate with respect to the number of colors of the gray color in the reading area of the manuscript image data 16. In a case where the numbers of colors registered in the respective read lists satisfy a certain rate, the re-reading determination unit 38 determines non-execution of the re-reading of the printed material 20 by the scanner 12 (NO in step S66).

On the other hand, in a case where any one of numbers of colors registered in the respective read lists does not satisfy a certain rate, the re-reading determination unit 38 determines execution of the re-reading of the printed material 20 by the scanner 12 (YES in step S66). The re-reading determination unit 38 outputs a result of the determination as to whether or not there is execution of re-reading of the printed material 20 by the scanner 12 to the display unit 35.

If a determination result indicating that re-reading of the printed material 20 is executed is input from the re-reading determination unit 38 (YES in step S66), the display unit 35 performs a warning display to display the warning message 65 in the reading area display screen 50 (step S67). Thus, in a case where the reading of the printed material 20 by the scanner 12 is not correctly performed due to various causes such as the reading area of the printed material 20 being not correctly set on the reading surface of the scanner 12, the fact can be indicated to the user.

In response to the warning display, the user resets the reading area of the printed material 20 on the reading surface of the scanner 12, and then clicks the scan start button 53 again. Thus, under the control of the control unit 30, the scanner 12 performs reading of the reading area of the printed material 20 again to generate the read image data 22 (RGB value) of the reading area (steps S44 and S45). Hereinafter, as described above, the input of the read image data 22 to the second image analysis unit 37, the analysis of the color distribution of the read image data 22 in the second image analysis unit 37, and the determination as to whether or not there is execution of re-reading in the re-reading determination unit 38 are repeatedly executed (steps S46, S47, and S65).

In a case where it is determined that the re-reading determination unit 38 does not execute re-reading of the printed material 20 in the scanner 12 (NO in step S66), the display unit 35 does not display the warning message 65 in the reading area display screen 50. Thus, the user can recognize that the reading of the reading area of the printed material 20 has been correctly performed by the scanner 12.

In a case where any of the numbers of colors registered in the respective read lists does not satisfy a certain rate even when the reading in the same reading area is performed twice, the reading area may be changed. In this case, the reading area setting unit 34 resets, for example, the candidate area including a secondly larger number of pixels in the list data 40 among the respective candidate areas, as the reading area. Since for a subsequent process, the above-described processes of step S43 and subsequent steps are repeatedly executed, description thereof will be omitted herein.

[Effects of this Embodiment]

As described above, in this embodiment, it is possible to indicate an appropriate reading area of the printed material 20 to the user since the reading area satisfying the allowable condition determined for the color distribution in the manuscript image data 16 in advance is automatically set and the setting position of the printed material 20 with respect to the scanner 12 is displayed on the basis of a result of the setting. Accordingly, it is not necessary for the reading by the scanner 12 to be repeated several times while changing the reading area of the printed material 20, and it is possible to perform reading of the reading area satisfying the above-described allowable condition in a short time (about once). Further, even in a case where the above-described specific color (particularly, the important color such as a corporate color) is different according to users or printed materials, it is possible to display the reading area according to the users or the printed materials by changing the allowable condition. Accordingly, particularly, when reading of the printed material 20 larger than the reading range of the scanner 12 is performed by the reading unit, it is possible to efficiently perform reading of the printed material.

[Image Reading Device of Second Embodiment]

Figure 14:
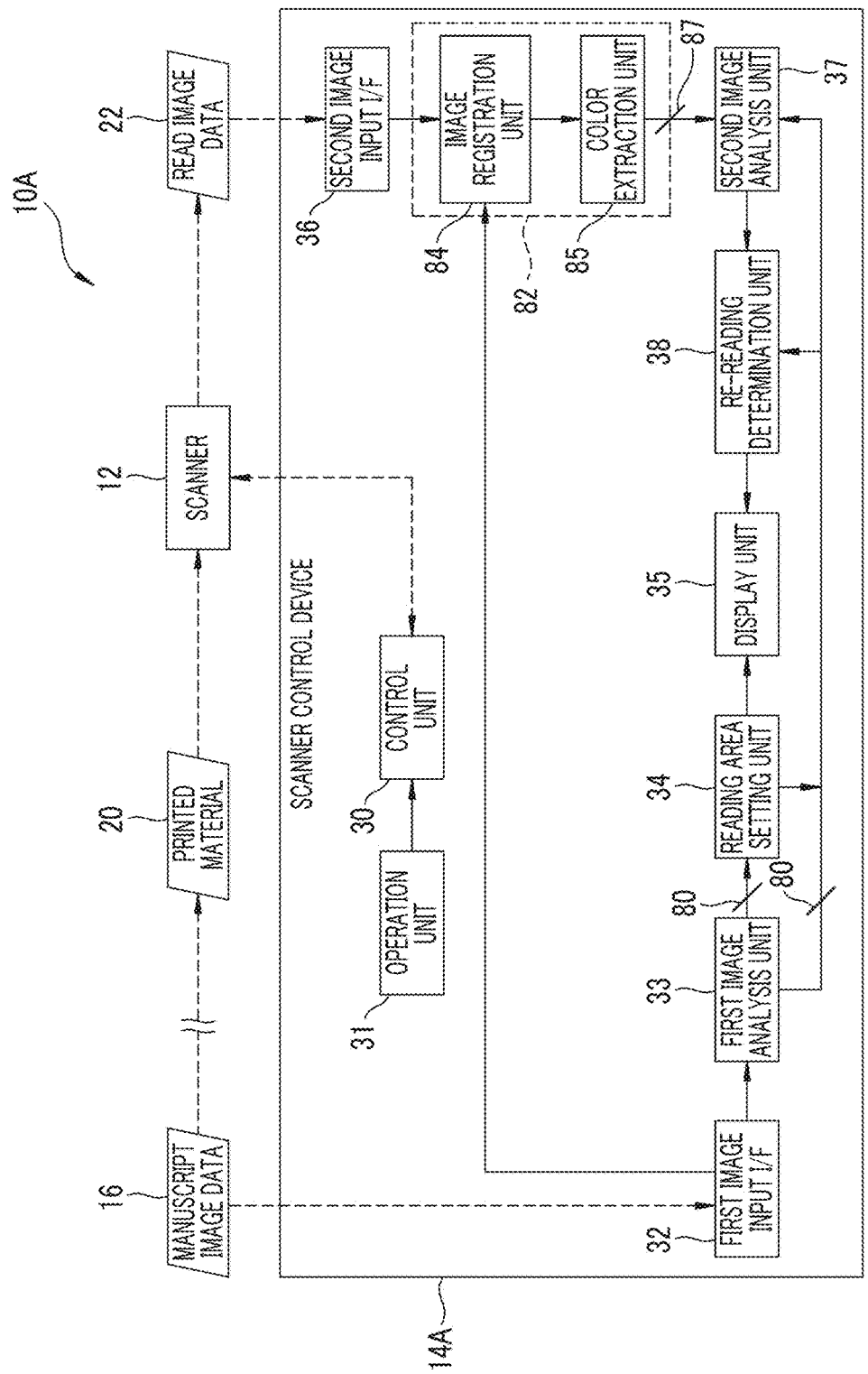
FIG. 14 is a schematic diagram illustrating an entire configuration of an image reading device according to a second embodiment.

Next, an image reading device 10A of a second embodiment will be described with reference to FIG. 14. FIG. 14 is a schematic diagram illustrating an entire configuration of the image reading device 10A of the second embodiment.

In the second image analysis unit 37 of the first embodiment, the determination of the color difference between the color (Lab value) of each pixel of the read image data 22 and each color (Lab value) of the specific color in the reading area registered in the list data 40 is performed. Thus, in the second image analysis unit 37, since the color difference determination is performed in the device-independent color space (Lab value), the color difference determination is likely to be affected by a difference in color gamut between the manuscript image data 16 and the read image data 22. Therefore, in the image reading device 10A, the color difference determination is performed in the device-dependent color space.

As illustrated in FIG. 14, the image reading device 10A has basically the same configuration as the image reading device 10 of the first embodiment except that a scanner control device 14A having a partially different configuration from the scanner control device 14 of the first embodiment is included. Therefore, units that are the same in function and configuration as in the first embodiment are denoted with the same reference numerals and a description thereof will be omitted.

The scanner control device 14A has basically the same configuration as the scanner control device 14 of the first embodiment except that the first image analysis unit 33 generates list data 80 different from the list data 40 of the first embodiment and that an image association unit 82 is included.

The first image analysis unit 33 of the second embodiment performs analysis of the color distribution of the manuscript image data 16 to generate list data 80 (see FIG. 15) in which the coordinates and CMYK values of the pixels having the above-described specific color (important color, high chroma color, and a gray color) are listed. That is, the first image analysis unit 33 of the second embodiment is different from that in the first embodiment in that the CMYK values of the pixels having the specific color rather than the Lab values of the pixels having the specific color are registered in the list data 80. Since a flow of generation of the list data 80 is basically the same as in the first embodiment illustrated in FIG. 3 described above, detailed description thereof will be omitted herein.

The image association unit 82 is provided between the second image input I/F 36 and the second image analysis unit 37. The read image data 22 is input from the second image input I/F 36 to the image association unit 82, and the manuscript image data 16 is input from the first image input I/F 32 to the image association unit 82. This image association unit 82 performs association between image positions of the manuscript image data 16 in the CMYK color space corresponding to a first color space of the present invention and the read image data 22 in the RGB color space corresponding to a second color space of the present invention and performs extraction of the color information from the image area at the corresponding position. Therefore, the image association unit 82 includes an image registration unit 84, and a color extraction unit 85.

The image registration unit 84 performs a process of associating the manuscript image data 16 with the read image data 22, that is, a registration process of specifying a positional relationship therebetween. For this registration process, a known method may be used. For example, a technology described in paragraphs [0064] to [0068] of JP2013-30996A may be used.

Specifically, the image registration unit 84 estimates a geometric correspondence relationship between the manuscript image data 16 and the read image data 22, and performs a geometric conversion process of matching the two pieces of image data on at least one of the two pieces of image data on the basis of the geometrical correspondence relationship. This geometric correspondence relationship includes at least one element among a displacement amount, a rotation angle, and a magnification ratio of the image between the two images to be compared. Further, for the estimation of the geometrical correspondence relationship between the two pieces of image data, for example, a method using a marker, a method using pattern matching, or a method using a phase-only correlation method may be used (see JP2013-30996A).

The color extraction unit 85 extracts color information in units of pixels from the image area at a corresponding position (an image area in which the manuscript image data 16 and the read image data 22 overlap) of the manuscript image data 16 and the read image data 22 after the registration process. Here, the color information extracted in units of pixels from "the image area at the corresponding position" of the manuscript image data 16 by the color extraction unit 85 is a CMYK value, and the color information extracted in units of pixels from the "image area at a corresponding position" of the read image data 22 is an RGB value. Accordingly, correspondence relationship data 87 (see FIG. 15) indicating the correspondence relationship (CMYK-RGB) between the CMYK value of the manuscript image data 16 and the RGB value of the read image data 22 is obtained. On the basis of this correspondence relationship data 87, it is possible to analyze the color distribution in the CMYK color space of the read image data 22. The color extraction unit 85 outputs the correspondence relationship data 87 to the second image analysis unit 37.

Figure 15:
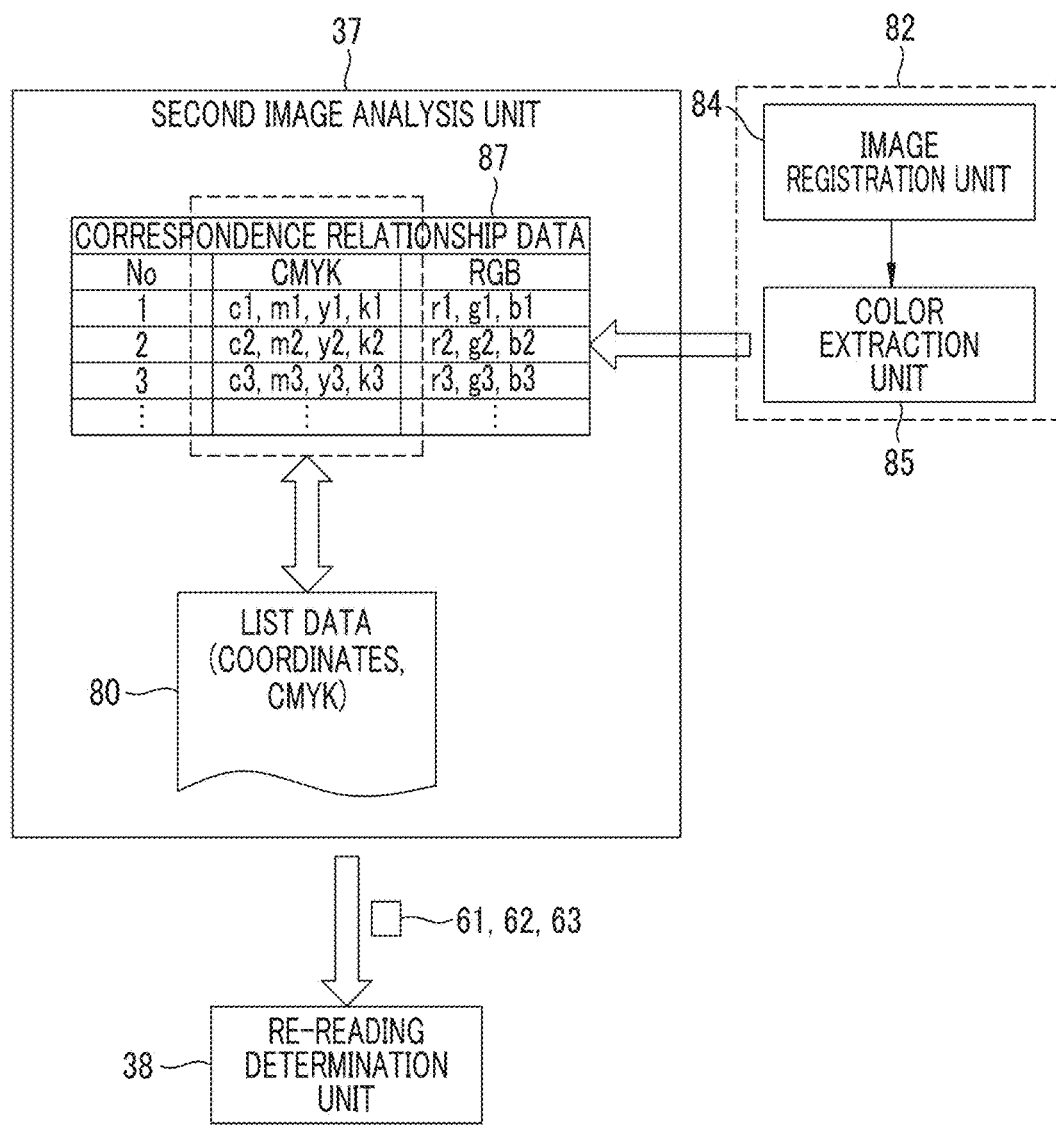
FIG. 15 is an illustrative diagram illustrating an analysis process of a color distribution of read image data in a second image analysis unit of the second embodiment.

FIG. 15 is an illustrative diagram illustrating an analysis process of the color distribution of the read image data 22 in the second image analysis unit 37 of the second embodiment. As illustrated in FIG. 15, the second image analysis unit 37 of the second embodiment performs analysis of the color distribution of the read image data 22 using the correspondence relationship data 87.

The second image analysis unit 37 of the second embodiment performs a color difference determination between a CMYK value of each pixel registered in the correspondence relationship data 87 and a CMYK value of each color of the specific color in the reading area registered in the list data 80 described above, and counts, for each color, the number of colors of which the color difference is within a predetermined range of a threshold value. Accordingly, as in the first embodiment, a read list (the read important color list 61, the read high-chroma list 62, and the read gray list 63) is obtained. Since a flow of the generation of the read list is basically the same as in the first embodiment (see FIG. 13), detailed description thereof will be omitted herein.

Here, as the above-described color difference determination, a color difference determination may be performed using, for example, a color difference of the device value (for example, each of ΔC, ΔM, ΔY, and ΔK, or a sum of ΔCMYK shown in Equation (1) below). Further, each of the CMYK value registered in the correspondence relationship data 87 and the CMYK value registered in the list data 80 described above may be subjected to the color difference determination with the color difference ΔE which is calculated from the Lab values obtained using a common profile [for example, JapanColor (registered trademark) profile]. In a case where the former is adopted, it is not necessary to consider a difference between a color gamut of the profile applied to the manuscript image data 16 and a color gamut of the printed material 20 read by the scanner 12 since the comparison is performed with the device-dependent CMYK value. In a case where the latter is adopted, it is not necessary to consider the difference between the color gamuts since the device-independent Lab value is calculated using a common profile from any of CMYK values. Further, since the determination can be performed with the color difference ΔE in a Lab space, it is easy to perform a determination as an apparent difference.

[Equation 1]

$$\text{sum of } \Delta CMYK = \sqrt{\Delta C^2 + \Delta M^2 + \Delta Y^2 + \Delta K^2} \quad (1)$$

Referring back to FIG. 14, the second image analysis unit 37 of the second embodiment outputs the read list to the re-reading determination unit 38. The re-reading determination unit 38 of the second embodiment determines whether or not there is execution of re-reading of the printed material 20 in the scanner 12, as in the first embodiment, on the basis of the read list input from the second image analysis unit 37, the list data 80 input from the first image analysis unit 33, and the result of setting of the reading area input from the reading area setting unit 34.

Thus, in the image reading device 10A of the second embodiment, the color difference determination is performed in the device-dependent color space (CMYK) in the second image analysis unit 37. Accordingly, when the color difference determination is performed, the color difference determination is prevented from being affected by a difference in color gamut between the manuscript image data 16 and the read image data 22. Further, since the image reading device 10A has basically the same configuration of the image reading device 10 in the first embodiment, the same effects as those described in the first embodiment can be obtained.

[Image Reading Device of Third Embodiment]

Figure 16:
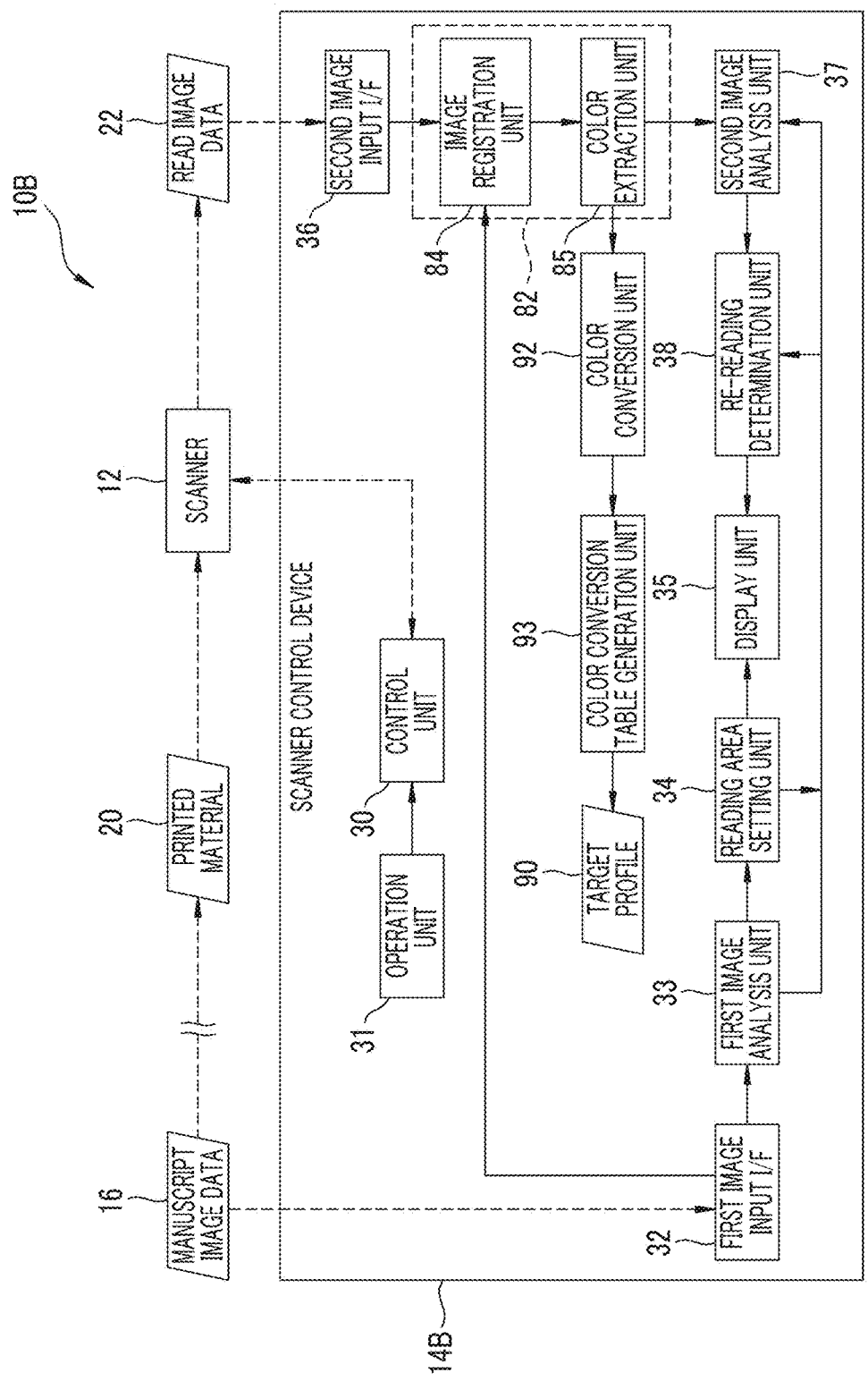
FIG. 16 is a schematic diagram illustrating an entire configuration of an image reading device according to a third embodiment.

Next, an image reading device 10B of a third embodiment will be described with reference to FIG. 16. FIG. 16 is a schematic diagram illustrating an entire configuration of the image reading device 10B of the third embodiment.

In the second embodiment, the analysis of the color distribution of the read image data 22 and the determination as to whether or not there is execution of re-reading of the printed material 20 in the scanner 12 are performed on the basis of the correspondence relationship data 87 generated by the image association unit 82. On the other hand, the image reading device 10B of the third embodiment further performs generation of a target profile 90 on the basis of correspondence relationship data 87.

The target profile 90 is also referred to as a "target profile" or an "input profile". The target profile 90 is a color conversion table describing a CMYK→Lab conversion relationship in which a target color of the CMYK signal of the manuscript image data 16 is defined in a device-independent color space (here, a Lab space).

As illustrated in FIG. 16, the image reading device 10B has basically the same configuration as the image reading device 10A of the second embodiment except that a scanner control device 14B having a partially different configuration from the scanner control device 14A of the second embodiment is included. Therefore, units that are the same in function and configuration as in each embodiment are denoted with the same reference numerals and a description thereof will be omitted.

The scanner control device 14B has basically the same configuration of the scanner control device 14A in the second embodiment except that a color conversion unit 92 and a color conversion table generation unit 93 are included.

The color conversion unit 92 performs a color conversion process of converting color information in a RGB space of the read image data 22 into color information of a Lab color space using the above-described scanner profile. Through the color conversion process in the color conversion unit 92, data indicating a correspondence relationship (CMYK-Lab) between the CMYK value and the Lab value of the manuscript image data 16 is obtained.

The color conversion table generation unit 93 generates a color conversion table which defines a conversion relationship (CMYK→Lab) for converting the image signal value (CMYK) into a chromaticity value (Lab) on the basis of data of a correspondence relationship (CMYK-Lab) which is generated through a process in the image association unit 82 and a process in the color conversion unit 92 to generate the target profile 90. Hereinafter, an example of the generation of the target profile 90 in the color conversion table generation unit 93 will be described.

The color conversion table generation unit 93 prepares a "provisional color conversion table" in which smoothness of a color change corresponding to an entire color space is ensured in advance, and locally (partially) corrects the provisional color conversion table using data (hereinafter simply referred to as "correspondence relationship data") indicating the correspondence relationship input from the above-described color conversion unit 92.

For the "provisional color conversion table" described herein, for example, in the case of an CMYK input, any one of color conversion tables indicating standard color reproduction in offset printing such as Japan Color (registered trademark), SWOP (Specifications Web Offset Printing), GRACoL (General Requirements for Applications in Commercial Offset Lithography), and Fogra may be used. In the case of RGB input, any one of color conversion tables such as sRGB and AdobeRGB may be used.

Further, the standard color conversion table as described above and the color conversion table generated by the color conversion table generation unit 93 in the past are stored in a database. The color conversion table generation unit 93 may select a color conversion table closest to the correspondence relationship data newly acquired on the basis of the read image data 22 and the manuscript image data 16 of the current printed material 20 from the database, and use this color conversion table as the "provisional color conversion table".

When a color conversion table closest to the correspondence relationship data is selected, the color conversion table generation unit 93 may automatically extract a color conversion table in which an average value of the color difference with this correspondence relationship data is smallest, a color conversion table in which a maximum value of the color difference with the correspondence relationship data is smallest, or the like from the database, and may use the selected color conversion table as "provisional color conversion table". A configuration in which, in a case where a plurality of candidates of the "provisional color conversion table" are extracted through automatic extraction, the candidates are displayed on the display unit 35 and are caused to be selected by the user can be adopted.

Then, the color conversion table generation unit 93 associates the CMYK value of the correspondence relationship data with a grid point [one or a plurality of (for example, two or four)] of the provisional color conversion table, and replaces the Lab value of the associated grid point with the Lab value of the corresponding correspondence relationship data. Since the color conversion table after correction obtained in this manner is obtained by locally replacing a chromaticity value of the grid point with respect to the provisional color conversion table, continuity (smoothness) of the chromaticity value is expected to deteriorate between the grid point of which the chromaticity value has been replaced and the grid point of which the chromaticity value has not been replaced. Therefore, it is preferable for a smoothing process to be further performed on the color conversion table after correction and for smoothness of conversion of the chromaticity value to be ensured. Thus, the color conversion table generation unit 93 generates the color conversion table after correction as the target profile 90.

As described above, in the image reading device 10B of the third embodiment, it is possible to generate the target profile 90. Therefore, in the image reading device 10B of the third embodiment, it is preferable for setting of the reading area optimal to the generation of the target profile 90 (that is, setting of the allowable condition) to be performed. With the image reading device 10B of the third embodiment, the effects described in the first embodiment and the second embodiment described above are also obtained.

[Image Reading Device of Fourth Embodiment]

Next, an image reading device of a fourth embodiment will be described. Since the image reading device of the fourth embodiment has basically the same configuration as that of the image reading device 10 in the first embodiment, units that are the same in function and configuration as in the first embodiment are denoted with the same reference numerals and a description thereof will be omitted (see FIG. 1).

The image reading device of the fourth embodiment is different from the image reading device 10 of the first embodiment in the method of analyzing the color distribution of the manuscript image data 16 in the first image analysis unit 33 (that is, the process of generating the list data 40) and the method of setting the reading area in the reading area setting unit 34.

<Color Distribution Analysis of Manuscript Image Data of Fourth Embodiment>

Figure 17:
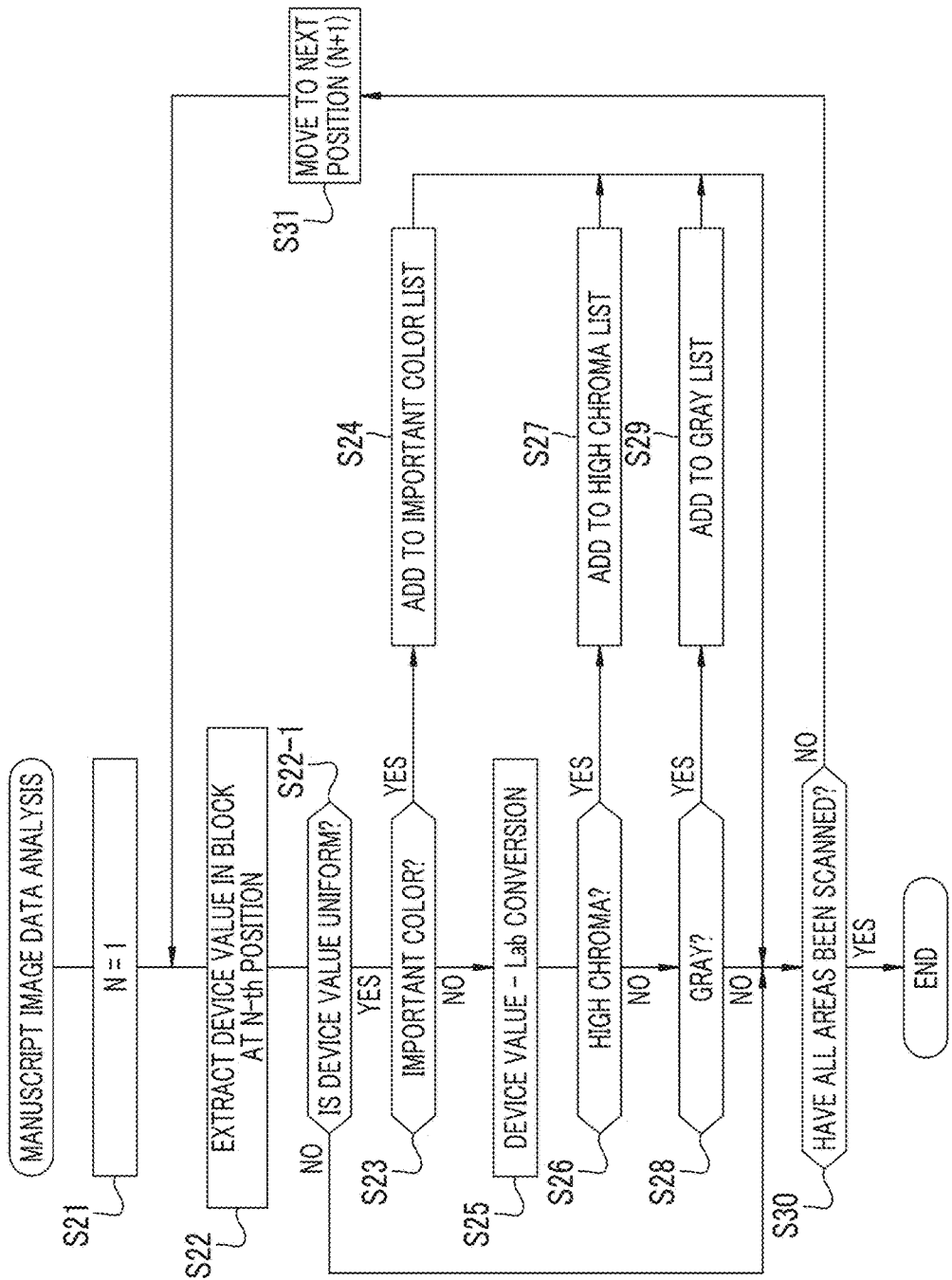
FIG. 17 is a flowchart illustrating a flow of list data in a first image analysis unit of a fourth embodiment.

FIG. 17 is a flowchart illustrating a flow of a process of generating the list data 40 in a first image analysis unit 33 of a fourth embodiment. As illustrated in FIG. 17, a flow of the process of generating the list data 40 in the fourth embodiment is basically the same as the flow of the process of generating the list data 40 in another example of the first embodiment described with reference to FIG. 4 described above.

However, the first image analysis unit 33 of the fourth embodiment determines whether or not the device values in the block are uniform when extracting the device values (CMYK values) in the block in step S22 (step S22-1). Specifically, in a case where the device values in the block are uniform, that is, when an area in the block is a screen tint area, the first image analysis unit 33 determines that the device values in the block are uniform. Further, the first image analysis unit 33 determines that the device values in the block are uniform as long as a variation in the device value is within a predetermined range of allowable values even when the device values in the block are uniform.

Then, in a case where the first image analysis unit 33 determines that the device values in the block are uniform (YES in step S22-1), the first image analysis unit 33 executes the processes from steps S23 to S29 described in FIG. 4 described above. Further, in a case where the first image analysis unit 33 determines that the device values in the block are not uniform (NO in step S22-1), the first image analysis unit 33 extracts device values (CMYK value) in the next block and determines whether the device values in this block are uniform (NO in step S30, step S31, and step S22-1). In a case where the first image analysis unit 33 determines that the device values in the block are uniform, the first image analysis unit 33 executes the processes of steps S23 to S29 described above again.

Hereinafter, similarly, the first image analysis unit 33 scans an entire area of the manuscript image data 16 in a block, and determines whether the color in the block corresponds to any one of an important color, a high chroma color, and a gray color for only a block in which the device values are uniform to generate the list data 40 described above.

Further, the first image analysis unit 33 analyzes the manuscript image data 16, obtains the number of colors included in the manuscript image data 16, and registers the number of colors in the list data 40. Hereinafter, the first image analysis unit 33 outputs the list data 40 and the manuscript image data 16 to the reading area setting unit 34, as in the first embodiment.

<Setting of Reading Area of Fourth Embodiment>

Figure 18A:
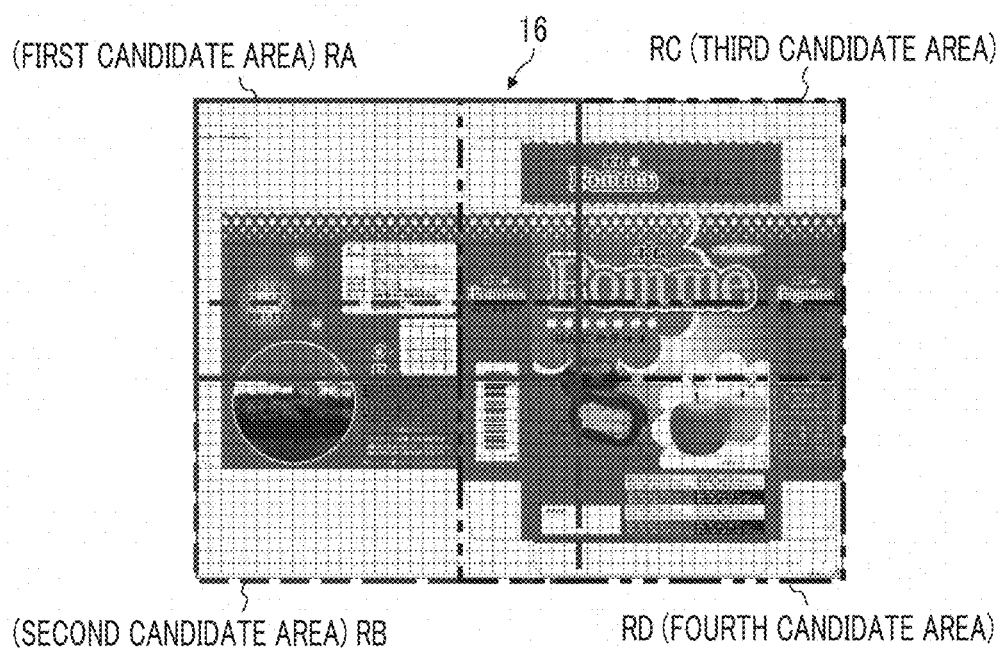
FIGS. 18A and 18B are illustrative diagrams illustrating setting of a reading area (candidate area) in a reading area setting unit according to the fourth embodiment.
Figure 18B:
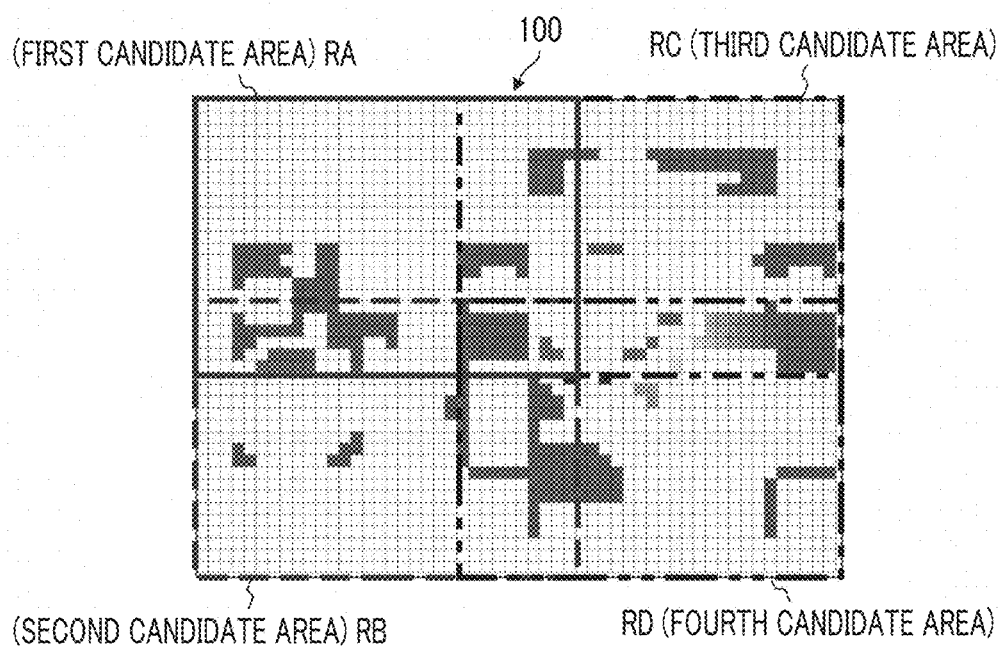

FIGS. 18A and 18B are illustrative diagrams illustrating setting of the reading area (candidate area) by the reading area setting unit 34 of the fourth embodiment. The reading area setting unit 34 of the fourth embodiment detects a screen tint area of the manuscript image data 16 by referring to the list data 40 input from the first image analysis unit 33. On the basis of a result of the detection of the tint area, the reading area setting unit 34 generates screen tint area image data 100 illustrated in FIG. 18B from the manuscript image data 16 illustrated in FIG. 18A.

Then, the reading area setting unit 34 sets, in the screen tint area image data 100, four candidate areas including the first candidate area RA to the fourth candidate area RD that are in contact with the outer periphery of the tint area image, starting from four corners of the screen tint area image based on the screen tint area image data 100.

The reading area setting unit 34 analyzes the color distribution in the respective candidate areas RA to RD, using the same scheme as that in the first image analysis unit 33 described with reference to FIG. 17 (see FIG. 17). That is, the reading area setting unit 34 scans the entire area in the candidate area in a block for each of the candidate areas RA to RD, and determines whether or not the color of each pixel in the block corresponds to any one of an important color, a high chroma color, and a gray color for only the block in which the device values are uniform. Further, the reading area setting unit 34 counts the number of all colors in the candidate area for each of the candidate areas RA to RD. Accordingly, color number totalizing data 95 (see FIG. 19) indicating the total number of colors of each of the candidate areas RA to RD, the number of colors of the important color, the number of colors of the high chroma color, and the number of colors of the gray color can be obtained.

FIG. 19 is an illustrative diagram illustrating an example of the color number totalizing data 95. In the color number totalizing data 95, an inclusion rate of "all", an inclusion rate of the "important colors", an inclusion rate of the "high chroma colors", and an inclusion rate of the "gray colors" are registered for each of the candidate areas RA to RD.

The inclusion rate of "all" indicates a rate of a total number of colors included in the respective candidate areas RA to RD to the total number of colors of the manuscript image data 16. The inclusion rate of the "important colors" indicates a rate of the number of important colors included in the respective candidate areas RA to RD to the total number of predetermined important colors. Further, the inclusion rate of the "high chroma colors" indicates a rate of the number of high chroma colors included in the respective candidate areas RA to RD to the total number of predetermined high chroma colors. Further, the inclusion rate of the "gray colors" indicates a rate of the number of gray colors included in the respective candidate areas RA to RD to the total number of predetermined gray colors. In this embodiment, the total number of important colors includes one blue color, the total number of high chroma colors includes two colors including red and green, and there is no setting for the gray color.

The reading area setting unit 34 sets the candidate area in which each inclusion rate described above is highest on average among the candidate areas RA to RD, as a reading area satisfying the allowable condition, by referring to the color number totalizing data 95. For example, in a case where the reading area setting unit 34 has referred to the color number totalizing data 95 illustrated in FIG. 19, the reading area setting unit 34 sets the second candidate area RB as the reading area. The reading area setting unit 34 may perform weighting on each inclusion rate of the color number totalizing data 95, and set the candidate area in which an integrated value or an average value of the inclusion rate after weighting is highest, as the reading area. Since a subsequent process is the same as in the first embodiment, detailed description thereof will be omitted herein.

Although the candidate area in which each inclusion rate of the color number totalizing data 95 is highest on average is set as the reading area in the fourth embodiment, for example, only the inclusion rate of "all" among the respective inclusion rates may be selected as a determination material, and the candidate area in which the inclusion rate of "all" is highest may be set as the reading area satisfying the allowable condition.

[Program Causing Computer to Function as Means for Displaying Reading Area of Printed Material]

A program causing a computer to function as the image reading device (reading area display device) described in the above-described embodiment can be recorded in a CD-ROM, a magnetic disk, or another computer-readable medium (non-transitory computer-readable tangible medium) and provided through the medium. Instead of an aspect in which the program is stored in such an information storage medium and provided, a program signal can be provided as a download service using a communication network such as the Internet.

Further, by incorporating the program into a computer, the computer is caused to realize each function of the image reading device (reading area display device), and a display of the reading area described in the above-described embodiment can be realized. Further, an aspect in which a portion or all of the program is incorporated into a host computer connected to the scanner 12 via a communication network, or an aspect in which a portion or all of the program is applied as an operating program of a CPU of the scanner 12 are also possible.

[Others]

Although the reading of the reading area of the printed material 20 is performed using the scanner 12 in each embodiment described above, various reading units capable of reading an image printed on the printed material 20, such as a camera, may be used.

Although the example in which the scanner and the scanner control device are separately provided has been described in each embodiment, the scanner and the scanner control device may be integrally formed.

Although the setting position of the printed material 20 with respect to the scanner 12 is indicated to the user by the reading area display screen 50 or 50A displayed on the display unit 35 in each embodiment described above, a message indicating the setting position of the printed material 20, for example, may be displayed on the display unit 35. This message is not particularly limited as long as the user understands the setting position of the printed material 20, and an example thereof is "Please align an upper left corner of the printed material with an upper left corner of the reading surface of the scanner". Further, the message may be indicated as sound to the user using a speaker or the like. In this case, sound indication of the speaker or the like functions as a display unit of the present invention.

Although the candidate areas starting from the four corners of the manuscript image are set in the manuscript image data in each embodiment described above, the candidate area may be set in a central portion of an image if interference with a top plate of the scanner 12 is not caused when the printed material 20 is set on the scanner 12.

In each embodiment described above, the re-reading determination unit 38 determines whether or not there is execution of re-reading of the printed material 20 on the basis of whether or not the number of colors registered in each read list described above satisfies a certain rate of the specific color to the number of specific colors in the reading area of the manuscript image data 16, but the present invention is not limited thereto. The result of the analysis of the color distribution of the manuscript image data 16 in the first image analysis unit 33 may be compared with the result of the analysis of the color distribution of the read image data 22 in the second image analysis unit 37 using various known methods to determine whether or not there is execution of re-reading of the printed material 20 in the scanner 12.

Although the example of the reading area display screen 50 or 50A indicating the setting position of the printed material 20 with respect to the scanner 12 is illustrated in FIGS. 9 and 10 in each embodiment described above, the setting position when the printed material 20 is viewed from the back surface may be displayed on the reading area display screen in a case where the printed surface of the printed material 20 is arranged on the reading surface of the scanner 12 in an overlapping manner. In this case, a display mode of the image based the manuscript image data 16 or the reading area image data 59 when viewed from the back surface side of the printed material 20 may be changed into a dotted line display or the like so that the user can understand the setting position when viewed from the back surface side of the printed material 20.

Further, the present invention is not limited to the above-described embodiments and it is understood that various modifications can be performed without departing from the spirit of the present invention. For example, at least two of the above-described embodiments may be appropriately combined.

EXPLANATION OF REFERENCES

10: image reading device
10A: image reading device
10B: image reading device
12: scanner
14: scanner control device
14A: scanner control device
14B: scanner control device
16: manuscript image data
20: printed material
22: read image data
33: first image analysis unit
34: reading area setting unit
35: display unit
37: second image analysis unit
38: re-reading determination unit
40: list data
82: image association unit
84: image registration unit
85: color extraction unit

What is claimed is:

1. An image reading device, comprising:
an image acquisition unit that, from an outside of the image reading device via a processor, acquires manuscript image data representing an image to be printed;
a first image analysis unit that, via the processor, analyzes a color distribution of the manuscript image data;
a reading unit that, via an imaging device, performs reading of a printed material on which the image has been printed on the basis of the manuscript image data;
a reading area setting unit that, via the processor, sets a reading area in which the reading unit performs reading of the printed material, on the basis of a result of the analysis of the color distribution of the manuscript image data by the first image analysis unit, and sets at least one or more areas satisfying an allowable condition determined for a color distribution in advance in the manuscript image data as the reading area; and
a display unit that, via a display, displays a setting position of the printed material with respect to the reading unit on the basis of a result of the setting of the reading area by the reading area setting unit,
wherein the reading unit performs reading of the printed material set in the reading unit after the setting position is displayed by the display unit.

2. The image reading device according to claim 1,
wherein the reading unit performs reading of the printed material that is larger than a reading range in which the reading unit is capable of reading the printed material.

3. The image reading device according to claim 1,
wherein the display unit displays the setting position to be overlapped on a reduced image generated on the basis of the manuscript image data.

4. The image reading device according to claim 1,
wherein the display unit selects and displays an area corresponding to the reading area in an image based on the manuscript image data.

5. The image reading device according to claim 1,
wherein the first image analysis unit extracts, for each pixel, a pixel having a predetermined specific color from the manuscript image data to generate a list in which the specific color and a pixel position of a pixel having the specific color are associated, and
the reading area setting unit sets a plurality of candidate areas that are candidates of the reading area in the manuscript image data, and sets the candidate area including at least the pixel in the list among the plurality of candidate areas as the reading area.

6. The image reading device according to claim 5,
wherein the reading area setting unit sets the candidate area including a largest number of pixels in the list among the plurality of candidate areas, as the reading area.

7. The image reading device according to claim 5,
wherein the specific color includes at least one of an important color, a chroma color, or a gray color that are determined in advance.

8. The image reading device according to claim 1, further comprising:
a second image analysis unit that analyzes a color distribution of the read image data of the printed material read by the reading unit; and
a re-reading determination unit that compares a result of the analysis of the color distribution of the read image data by the second image analysis unit with the analysis result of the color distribution of the manuscript image data by the first image analysis unit to determine whether or not there is execution of re-reading of the printed material by the reading unit.

9. The image reading device according to claim 5, further comprising:
a second image analysis unit that analyzes a color distribution of the read image data of the printed material read by the reading unit; and
a re-reading determination unit that compares a result of the analysis of the color distribution of the read image data by the second image analysis unit with the analysis result of the color distribution of the manuscript image data by the first image analysis unit to determine whether or not there is execution of re-reading of the printed material by the reading unit,
wherein the second image analysis unit analyzes the color distribution of the read image data and counts the number of colors of which a color difference with the specific color is within a range of a predetermined threshold value, and
the re-reading determination unit determines non-execution of the re-reading in a case where the number of colors counted by the second image analysis unit satisfies a predetermined certain rate with respect to the number of specific colors registered in the list, and determines execution of the re-reading in a case where the number of colors does not satisfy the certain rate.

10. The image reading device according to claim 8,
wherein the manuscript image data is image data of a first color space, and the read image data is image data of a second color space,
the image reading device further comprises:
a registration unit that performs a registration process of specifying a positional relationship between the read image data read by the reading unit and the manuscript image data; and
a color extraction unit that acquires color information from an image position at which the read image data and the manuscript image data correspond to each other after the registration process, and the second image analysis unit analyzes the color distribution in the first color space of the read image data on the basis of the color information extracted by the color extraction unit.

11. An image reading method of performing reading of a printed material using a reading unit that performs reading of a printed material, the image reading method comprising:
   acquiring, from an outside, manuscript image data representing an image to be printed;
   analyzing a color distribution of the manuscript image data;
   setting a reading area in which the reading unit performs reading of the printed material on which the image has been printed on the basis of the manuscript image data, on the basis of a result of the analysis of the color distribution of the manuscript image data in the analyzing, and setting at least one or more areas satisfying an allowable condition determined for a color distribution in advance in the manuscript image data as the reading area;
   displaying a setting position of the printed material with respect to the reading unit on the basis of a result of the setting of the reading area in the setting; and
   performing reading of the printed material set in the reading unit after the setting position is displayed in the displaying.

12. A reading area display device that displays a reading area of a printed material when reading of the printed material is performed by a reading unit that performs reading of the printed material, the reading area display device comprising:
   an image acquisition unit that, from an outside of the reading area display device via a processor, acquires manuscript image data representing an image to be printed;
   a first image analysis unit that, via the processor, analyzes a color distribution of the manuscript image data;
   a reading area setting unit that, via the processor, sets a reading area in which the reading unit performs reading of the printed material on which the image has been printed on the basis of the manuscript image data, on the basis of a result of the analysis of the color distribution of the manuscript image data by the first image analysis unit, and sets at least one or more areas satisfying an allowable condition determined for a color distribution in advance in the manuscript image data as the reading area; and
   a display unit that, via a display, displays a setting position of the printed material with respect to the reading unit on the basis of a result of the setting of the reading area by the reading area setting unit.

13. A reading area display method of displaying a reading area of a printed material when reading of the printed material is performed by a reading unit that performs reading of the printed material, the reading area display method comprising:
   acquiring, from an outside, manuscript image data representing an image to be printed;
   analyzing a color distribution of the manuscript image data;
   setting a reading area in which the reading unit performs reading of the printed material on which the image has been printed on the basis of the manuscript image data, on the basis of a result of the analysis of the color distribution of the manuscript image data in the analyzing, and setting at least one or more areas satisfying an allowable condition determined for a color distribution in advance in the manuscript image data as the reading area; and
   displaying a setting position of the printed material with respect to the reading unit on the basis of a result of the setting of the reading area in the setting.

14. A non-transitory computer-readable tangible medium having a program for causing a computer to function for displaying a reading area of a printed material when reading of the printed material is performed by a reading unit that performs reading of the printed material, the program causing the computer to function as:
   an image acquisition unit that, from an outside of the computer via a processor, acquires manuscript image data representing an image to be printed;
   a first image analysis unit that, via the processor, analyzes a color distribution of the manuscript image data;
   a reading area setting unit that, via the processor, sets a reading area in which the reading unit performs reading of the printed material on which the image has been printed on the basis of the manuscript image data, on the basis of a result of the analysis of the color distribution of the manuscript image data by the first image analysis unit, and sets at least one or more areas satisfying an allowable condition determined for a color distribution in advance in the manuscript image data as the reading area; and
   a display unit that, via a display, displays a setting position of the printed material with respect to the reading unit on the basis of a result of the setting of the reading area by the reading area setting unit.

* * * * *